(12) United States Patent
Pischel

(10) Patent No.: US 10,976,777 B2
(45) Date of Patent: Apr. 13, 2021

(54) DOCKING STATION

(71) Applicant: Gamber-Johnson LLC, Stevens Point, WI (US)

(72) Inventor: Travis Pischel, Marshfield, WI (US)

(73) Assignee: GAMBER-JOHNSON LLC, Stevens Point, WI (US)

( * ) Notice: Subject to any disclaimer, the term of this patent is extended or adjusted under 35 U.S.C. 154(b) by 15 days.

(21) Appl. No.: 16/541,936

(22) Filed: Aug. 15, 2019

(65) Prior Publication Data

US 2021/0048848 A1 Feb. 18, 2021

(51) Int. Cl.
*G06F 1/16* (2006.01)

(52) U.S. Cl.
CPC .......... *G06F 1/1632* (2013.01); *G06F 1/1679* (2013.01)

(58) Field of Classification Search
CPC .............................. G06F 1/1632; G06F 1/1679
See application file for complete search history.

(56) References Cited

U.S. PATENT DOCUMENTS

| | | | |
|---|---|---|---|
| 5,633,782 A | 5/1997 | Goodman et al. | |
| 5,751,546 A | 5/1998 | Clark et al. | |
| 5,790,375 A | 8/1998 | Lee | |
| 5,867,774 A | 2/1999 | Summers et al. | |
| 6,042,414 A | 3/2000 | Kunert | |
| 6,053,759 A | 4/2000 | Kunert | |
| 6,069,790 A | 5/2000 | Howell et al. | |
| 6,101,087 A | 8/2000 | Sutton et al. | |
| 6,176,401 B1 * | 1/2001 | Lim ..................... G08B 3/1058 224/196 |
| 6,229,893 B1 | 5/2001 | Chen | |
| 6,264,488 B1 | 7/2001 | Helot et al. | |
| 6,457,789 B2 | 10/2002 | Hällsten | |
| 6,520,466 B1 | 2/2003 | Blanchard, III et al. | |
| 6,532,152 B1 | 3/2003 | White et al. | |
| 6,549,416 B2 | 4/2003 | Sterner et al. | |
| 6,585,212 B2 | 7/2003 | Carnevali | |

(Continued)

OTHER PUBLICATIONS

Gamber Johnson, Dell D600/D610 Docking Cradles, features sheet, undated, 1 page.

(Continued)

*Primary Examiner* — Rockshana D Chowdhury
(74) *Attorney, Agent, or Firm* — Michael Best & Friedrich LLP

(57) ABSTRACT

A docking station for supporting an electronic device includes a body having a cradle portion. A latching mechanism is coupled with the body and movable between a first position configured to permit insertion of the electronic device into the docking station, and a second position configured to secure the electronic device in the docking station. The latching mechanism includes an activation portion configured to contact a first surface of the electronic device and to automatically move, via the contact during insertion of the electronic device into the docking station, from an activation portion first position extending from the body, to an activation portion second position. The latching mechanism further includes a latch portion configured to engage a second surface of the electronic device when the latching mechanism is in the second position. The latch portion is movable in response to movement of the activation portion.

25 Claims, 17 Drawing Sheets

(56) References Cited

U.S. PATENT DOCUMENTS

| | | |
|---|---|---|
| 6,647,248 B1 | 11/2003 | Ortscheid et al. |
| 6,785,567 B2 | 8/2004 | Kato |
| 7,017,243 B2 | 3/2006 | Carnevali |
| 7,052,296 B2 | 5/2006 | Yang et al. |
| 7,180,753 B2 | 2/2007 | Kerrigan et al. |
| 7,273,203 B2 | 9/2007 | Carnevali |
| 7,274,564 B2 | 9/2007 | Rossini |
| D585,897 S | 2/2009 | Carnevali |
| 7,911,779 B1 | 3/2011 | Tarnoff |
| 8,179,672 B2 | 5/2012 | Carnevali |
| 8,182,426 B2 | 5/2012 | Zhao et al. |
| 8,315,048 B2 | 11/2012 | Tarnoff |
| 9,535,457 B1 * | 1/2017 | Vier ............ G06F 1/1632 |
| 9,612,616 B2 | 4/2017 | Tarnoff |
| 9,898,041 B2 * | 2/2018 | Blowers ............ E05C 3/16 |
| 9,964,992 B2 | 5/2018 | Tarnoff |
| 2003/0083115 A1 | 5/2003 | Kato |
| 2003/0174855 A1 | 9/2003 | Hawkins et al. |
| 2007/0127204 A1 | 6/2007 | Muenzer et al. |
| 2007/0190843 A1 | 8/2007 | Snow et al. |
| 2008/0239658 A1 | 10/2008 | Chou |
| 2008/0270664 A1 | 10/2008 | Carnevali |
| 2009/0045234 A1 | 2/2009 | Carnevali |
| 2009/0140113 A1 | 6/2009 | Carnevali |
| 2009/0179435 A1 | 7/2009 | Lev |
| 2009/0201636 A1 | 8/2009 | Doherty et al. |
| 2009/0213536 A1 | 8/2009 | Lewandowski et al. |
| 2011/0095159 A1 | 4/2011 | Carnevali |
| 2011/0266230 A1 | 11/2011 | Carnevali |
| 2012/0045931 A1 | 2/2012 | Carnevali |
| 2012/0045932 A1 | 2/2012 | Carnevali |
| 2018/0232007 A1 | 8/2018 | Tarnoff |

OTHER PUBLICATIONS

RAM Mounts, UNPKD Passive RAM Cradle Motion C5, part details webpage, printed Aug. 24, 2009 from http://www.ram-mount.com/CatalogResults/PartDetails/tabid/63/partid/08206-5077045072 . . . , 1 page.

RAM Mounts, RAM Mount for Motion C5, part details webpage, printed Jul. 29, 2009 from http://www.ram-mount.com/CatalogResults/PartDetails/tabid/63/partid/08206-5077045049 . . . , 1 page.

RAM Mounts, RAM Dbl Suction Mount for Motion C5, part details webpage, printed Jul. 29, 2009 from http://www.ram-mount.com/CatalogResults/PartDetails/tabid/63/partid/08206-5077045049 . . . , 1 page.

RAM Mounts, RAM Aircraft Seat Rail Sys Motion L5800, part details webpage, printed Jul. 29, 2009 from http://www.ram-mount.com/CatalogResults/PartDetails/tabid/63/partid/08206-5077045049 . . . , 1 page.

RAM Mounts, RAM Mounts for the Panasonic Toughbook CF-H1, product webpages, undated, 2 pages.

Rugged PC review.com, RAM Mounts for Panasonic Toughbook CF-H1, product webpages, undated, 2 pages.

Rugged PC review.com, Panasonic Toughbook H1, product webpages, undated, 11 pages.

* cited by examiner

DOCKING STATION

BACKGROUND

The present invention relates to docking stations.

Electronic devices, such as portable, tablet-style computers, are known for use in various industries. Docking stations are often provided to secure the electronic device to a support structure and/or electronically connect the electronic device to other devices and/or to a power supply.

SUMMARY

In one aspect, the invention provides a docking station for supporting an electronic device. The docking station includes a body having a cradle portion configured to support a portion of the electronic device. The docking station further includes a latching mechanism coupled with the body and movable between a latching mechanism first position configured to permit insertion of the electronic device into the docking station, and a latching mechanism second position configured to secure the electronic device in the docking station. The latching mechanism includes an activation portion configured to contact a first surface of the electronic device. The activation portion is automatically movable via contact with the electronic device during insertion of the electronic device into the docking station from an activation portion first position extending from the body, to an activation portion second position. The latching mechanism further includes a latch portion configured to engage a second surface of the electronic device when the latching mechanism is in the latching mechanism second position. The latch portion is movable in response to movement of the activation portion from the activation portion first position to the activation portion second position.

In another aspect the invention provides a docking station for supporting an electronic device. The docking station includes a body having a cradle portion configured to support a portion of the electronic device and a latching mechanism pivotally coupled with the body and pivotable between a latching mechanism first position configured to permit insertion of the electronic device into the docking station, and a latching mechanism second position configured to secure the electronic device in the docking station. The latching mechanism is biased toward the latching mechanism first position by a biasing member. The latching mechanism includes an activation portion configured to contact a first surface of the electronic device. The activation portion is automatically movable via contact with the electronic device during insertion of the electronic device into the docking station from an activation portion first position extending from the body, to an activation portion second position at least partially retracted into the body. The latching mechanism further includes a latch portion configured to engage a second surface of the electronic device when the latching mechanism is in the latching mechanism second position. The latch portion is movable in response to movement of the activation portion from the activation portion first position to the activation portion second position. A securing member is coupled with the body and movable from a first securing member position when the latching mechanism is in the first latching mechanism position, to a second securing member position when the latching mechanism is in the second latching mechanism position. The second securing member position secures the latching mechanism in the second latching mechanism position. The securing member is biased toward the second securing member position. The docking station further includes a lock mechanism movable from an unlocked position that allows the securing member to move to the first securing member position, to a locked position that prevents the securing member from moving to the first securing member position.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
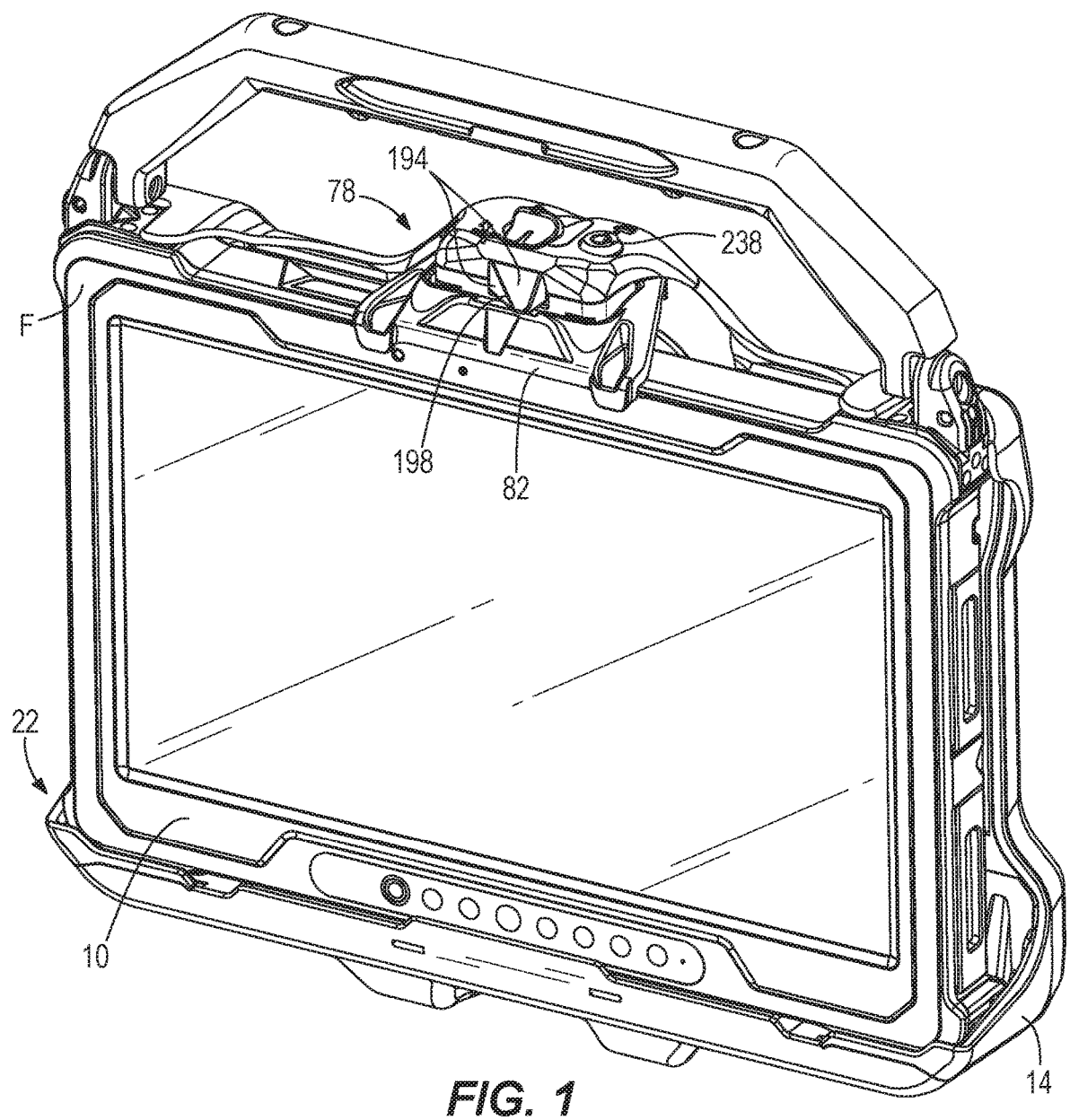
FIG. 1 is a front perspective view showing a portable computer docked in a computer docking station showing an exemplary embodiment of the invention.

FIG. 1 illustrates a portable computer 10 docked in a docking station 14 that is one exemplary embodiment of the present invention. The docking station 14 can be configured to support electronic devices of all types (e.g., computers, phones, keyboards, printers, etc.), but the illustrated electronic device is a portable computer 10 of the tablet-style, and is shown as a Getac A140 portable computer.

The docking station 14 is operable to support, and optionally, electrically couple to the computer 10 when the computer 10 is not being carried by hand. The docking station 14 can be mounted virtually anywhere the computer might be used, including in a room or in a vehicle. Additionally, the docking station 14 can be mounted on a movable cart, desk, or the like to render the computer 10 mobile even when docked in the docking station 14. Various mounting hardware (not shown) can be used to secure the docking station 14 in the appropriate manner to a support surface. The illustrated docking station 14 is configured to have a shape that is form-fitting to the computer 10 such that very little of the docking station 14 can be seen when the computer 10 is docked with the docking station 14.

Figure 2:
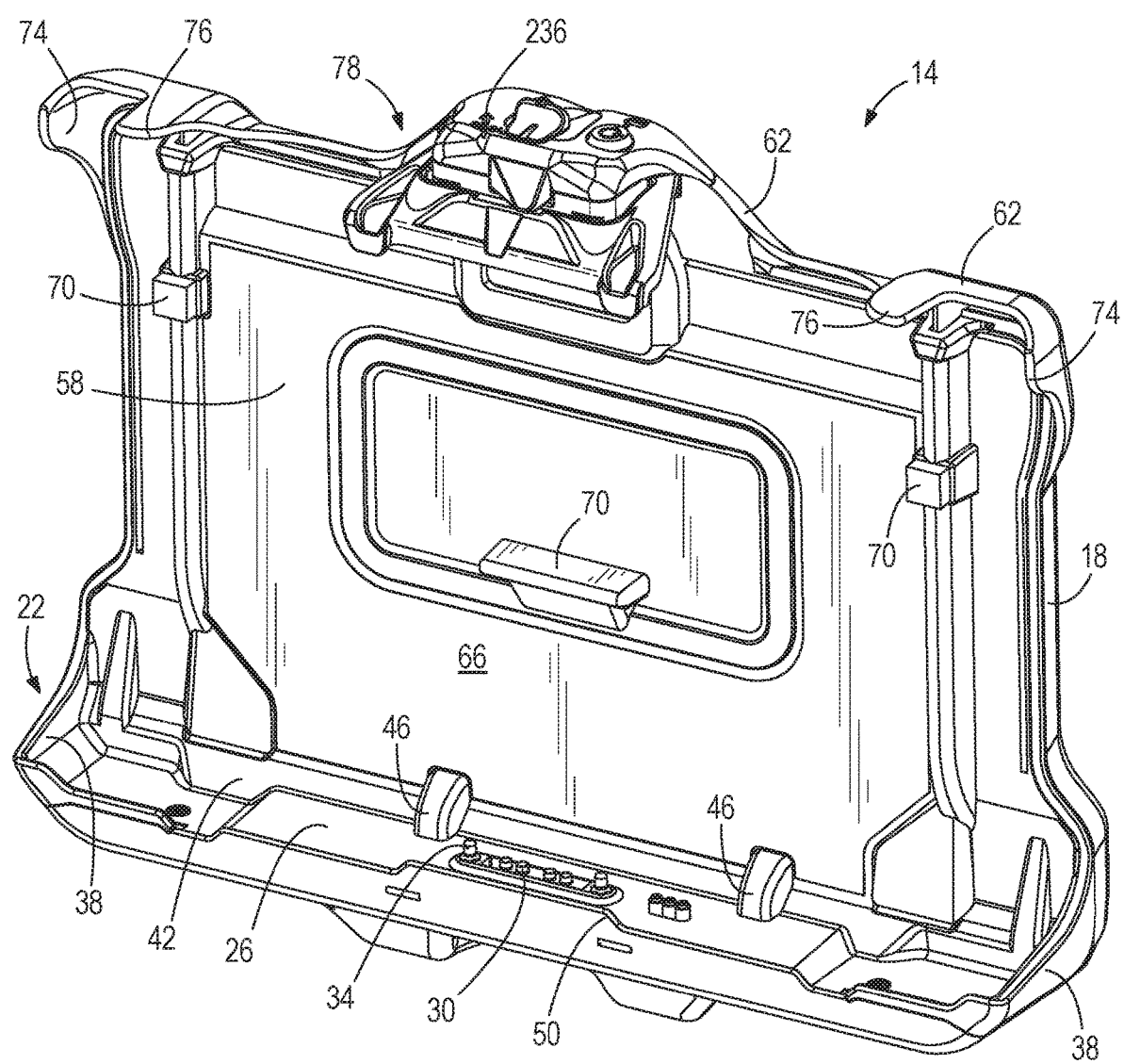
FIG. 2 is a front perspective view of the computer docking station of FIG. 1.
Figure 3:
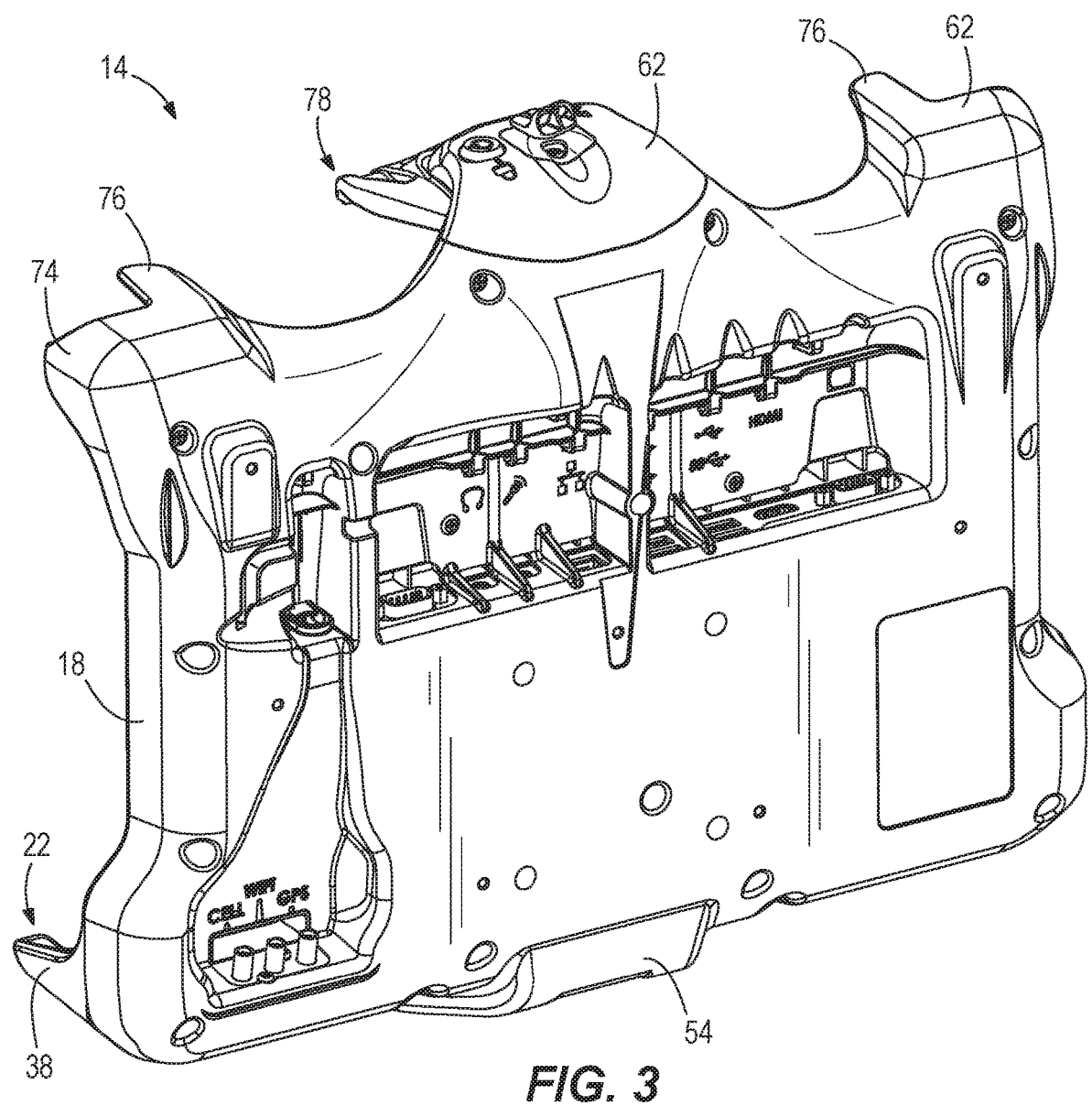
FIG. 3 is a rear perspective view of the computer docking station of FIG. 2.
Figure 4:
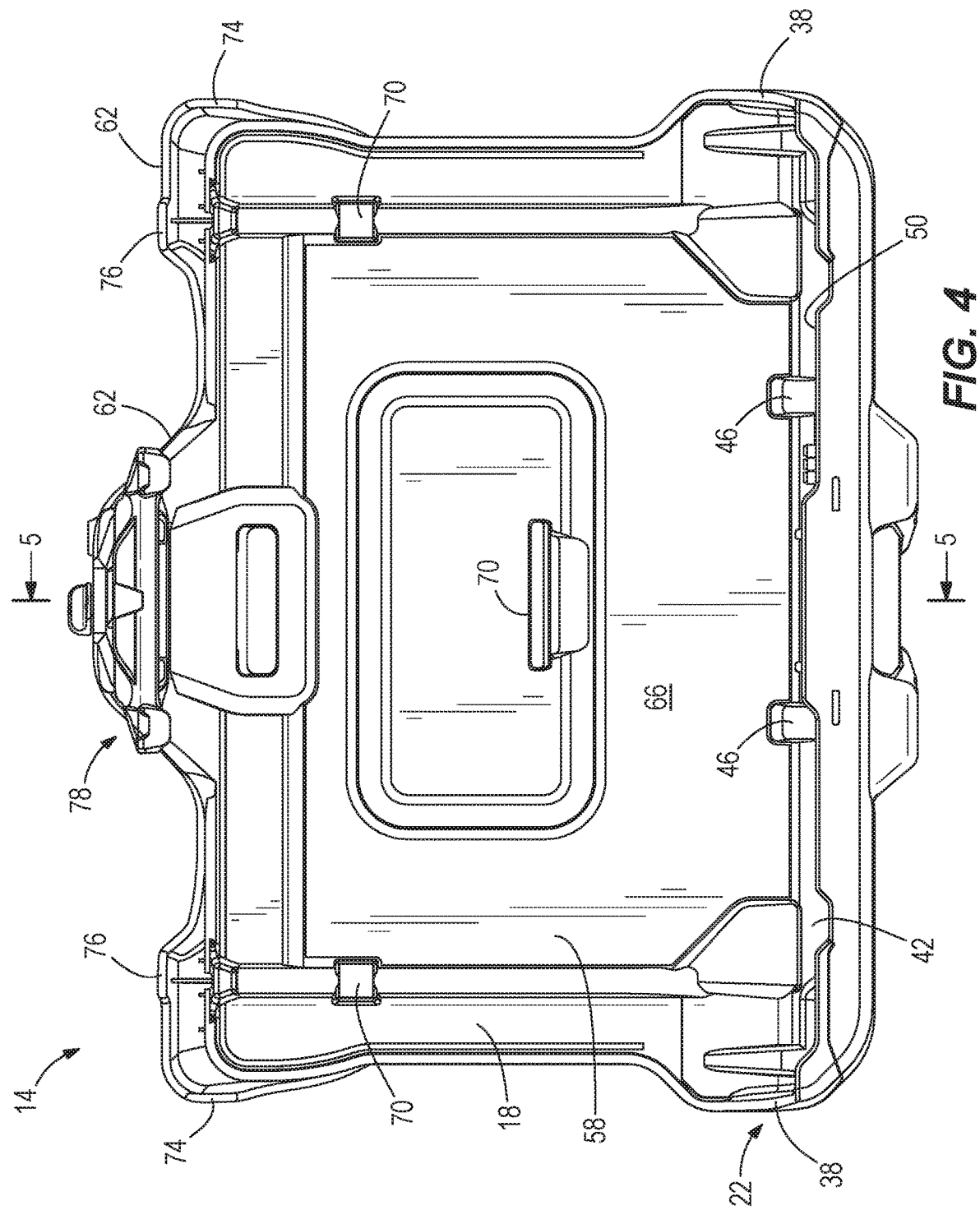
FIG. 4 is a front view of the computer docking station of FIG. 2.

Referring now to FIGS. 2-4, the docking station 14 includes a body 18 that is primarily plastic (e.g., polycarbonate resin), but in other embodiments could be primarily metal or other suitable materials. The illustrated docking station 14 also includes some nylon parts, steel brackets, electrical components, and steel hardware. The body 18 includes a cradle portion 22 configured to support a portion of the computer 10, and in the illustrated embodiment supports a bottom edge or lower portion of the computer 10. As used herein and in the appended claims, the terms "upper", "lower", "top", "bottom", "front", "rear", and other directional terms are not intended to require any particular orientation, but are instead used for purposes of description only. The cradle portion 22 includes a base wall 26 sized and configured to engage and support the lower edge of the computer 10.

In the illustrated embodiment, the base wall 26 also supports a connector 30 (see FIG. 2) sized and configured to electrically couple with a mating docking connector (not shown) on the computer 10. The electrical coupling of computers and docking stations using connectors 30 and the mating docking connectors on computers is well known, and will not be described further. Grounding pins 34 also extend from the base wall 26 on opposite sides of the connector 30 to ground the computer 10 when it is docked in the docking station 14.

The base wall 26 transitions into opposing, generally parallel side walls 38 that further define the cradle portion 22 and engage oppositely-facing lower side edges of the computer 10. In the illustrated embodiment, the base wall 26 and each side wall 38, along with the transitions therebetween are sized and configured to engage and support lower edge corners of the computer 10.

The cradle portion 22 is also partly defined by a rear wall 42 intersecting the base wall 26 to engage and support a lower rear surface of the computer 10 when it is positioned in the cradle portion 22. The illustrated rear wall 42 includes one or more alignment projections 46 sized, configured, and positioned to align with recesses (not shown) in the rear surface of the computer 10. The alignment projections 46 help to obtain an aligned, snug fit of the computer 10 within the cradle portion 12.

The cradle portion 22 further includes at least one flange 50 extending from the base wall 26 to engage and support a front surface of the computer 10 when it is positioned in the cradle portion 22, thereby securing the lower portion of the computer 10 within the cradle portion 22. The illustrated embodiment includes a stepped flange 50 that varies in height. The highest portion of the flange 50 extends from a central portion of the base wall 26, while lower portions of the flange 50 are on either side of the central portion.

A connection module 54 is coupled with the cradle portion 22 and extends onto the rear surface of the docking station. As best shown in FIG. 3, the connection module 54 includes electrical connections (e.g., a power connection, a network or phone connection, standard pin connections for monitors, printers, and the like, and USB ports). The various electrical connections are electrically coupled to the computer through the connector 30, as is well known, and are accessible via ports provided on the rear surface of the docking station 14 (see FIG. 3).

With continued reference to FIGS. 2 and 4, the body 18 of the docking station 14 further includes a rear wall portion 58 extending from the cradle portion 22 and configured to support, cover, and protect the rear surface of the computer 10 when docked in the docking station 14. The illustrated rear wall portion 58 of the body 18 extends between the cradle portion 22 and an upper constraining portion 62 of the body 18. As will be described in greater detail below, the upper constraining portion 62 of the body 18 is configured to secure the computer 10 into the docking station 14. In the illustrated embodiment, the rear wall portion 58 has a front surface 66 that faces the rear surface of the computer 10 and that transitions the rear wall 42 of the cradle portion 22 into the upper constraining portion 62 of the body 18. The front surface 66 includes one or more support features 70 that contact the rear surface of the computer 10 when the computer is installed in the docking station 14. It should be understood that the support features 70 can vary depending on the particular electronic device used with the docking station 14.

The upper constraining portion 62 of the body 18 extends from a remainder of the body 18 in a direction generally parallel to the base wall 26, so as to extend beyond the rear surface of a docked computer 10 and toward the front surface (i.e., the surface containing the display screen), to thereby at least partially receive and cover an upper edge of the docked computer 10. The upper constraining portion 62 includes opposing, generally parallel side walls 74 that engage oppositely-facing upper edges of the computer 10. In the illustrated embodiment, the upper constraining portion 62, with each side wall 74, engages and supports upper edge corners of the computer 10. The illustrated upper constraining portion 62 further includes two forwardly-projecting fingers 76 that engage an upper surface of the computer 10 at least during installation.

Figure 5:
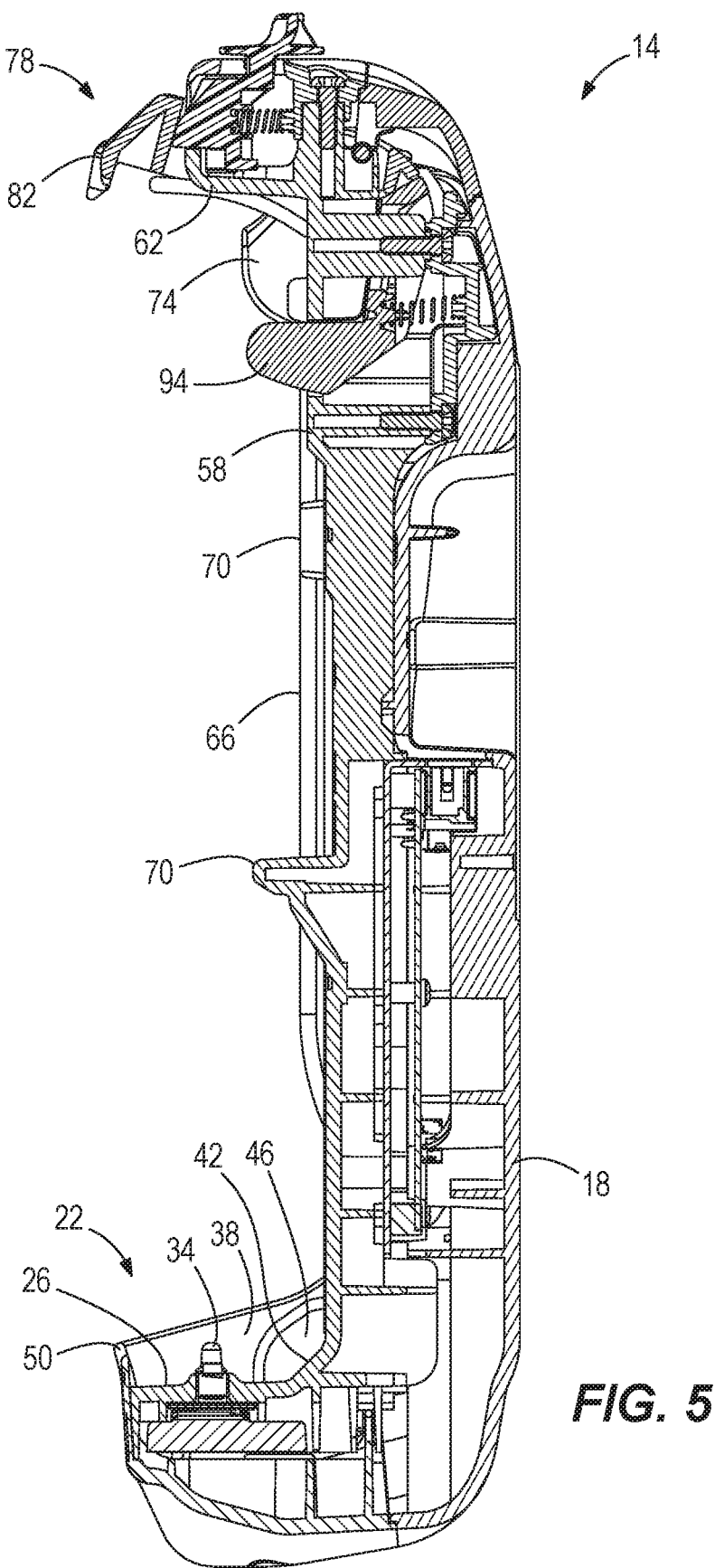
FIG. 5 is a section view of the computer docking station taken along line 5-5 of FIG. 4.

A latching mechanism 78 is coupled with the body 18 and cooperates with the upper constraining portion 62 to secure the computer 10 in the docking station. The latching mechanism 78 is movable between a latching mechanism first or unlatched position configured to permit insertion of the computer 10 into the docking station 14 (see FIGS. 5, 6, and 8), and a latching mechanism second or latched position configured to secure the computer 10 in the docking station 14 (see FIGS. 1, 2, 7, and 10-12).

With reference to FIGS. 8-10 and 13, the latching mechanism 78 includes a latch portion 82 configured to contact a surface (e.g., a front face or surface F) of the computer 10 to hold and secure the computer 10 in the docking station 14 when the latching mechanism 78 is in the latched position by preventing movement of the computer 10 in a direction away from the front surface 66 of the rear wall portion 58. The front face F is a surface of the computer that is visible to a user when the computer 10 is installed in the docking station 14 and the latching mechanism 78 is in the latched position.

Figure 8:
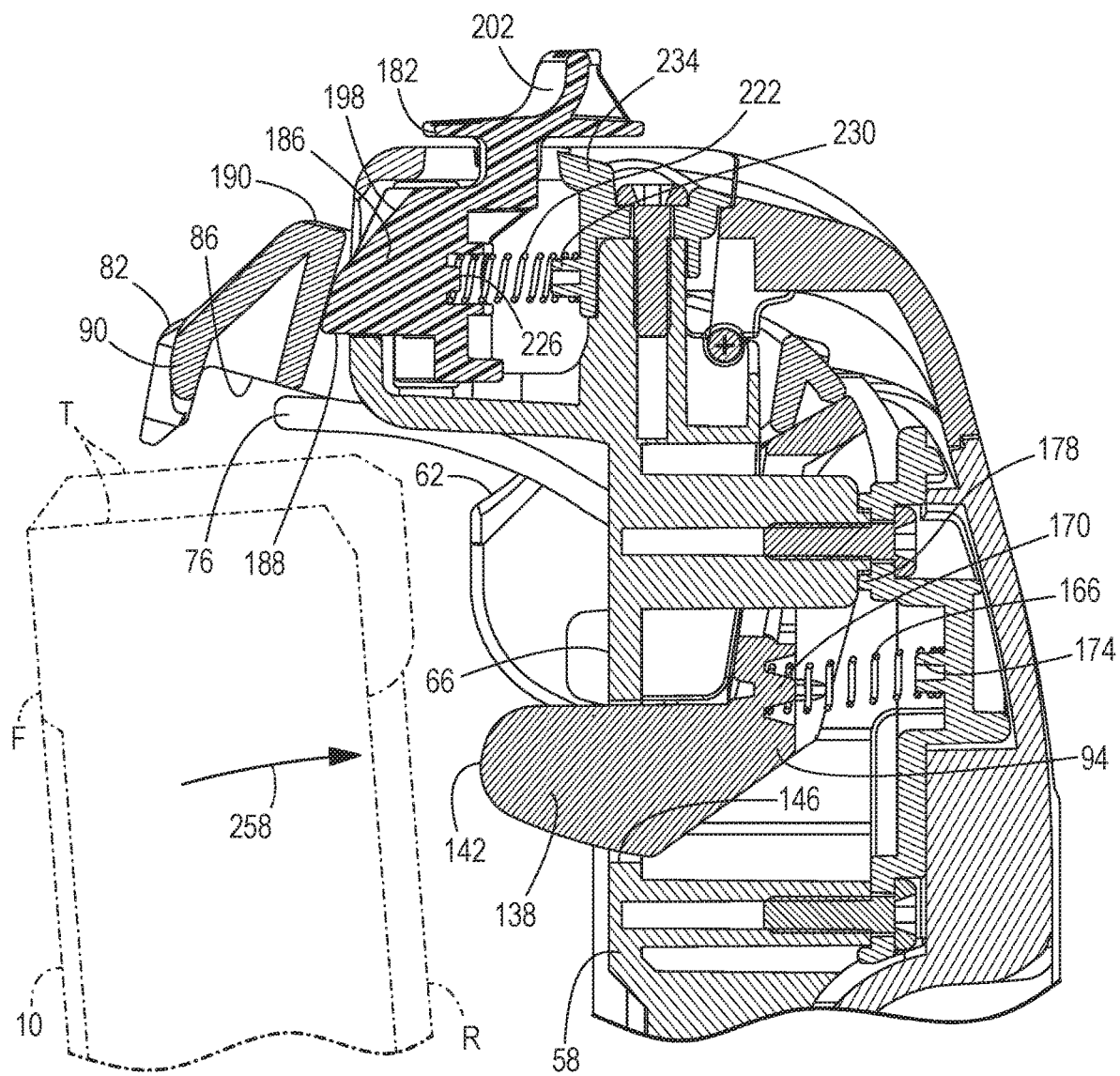
FIG. 8 is an enlarged partial section view of the docking station of FIG. 2 shown with the latching mechanism in the first, unlatched position to receive a portable computer.
Figure 9:
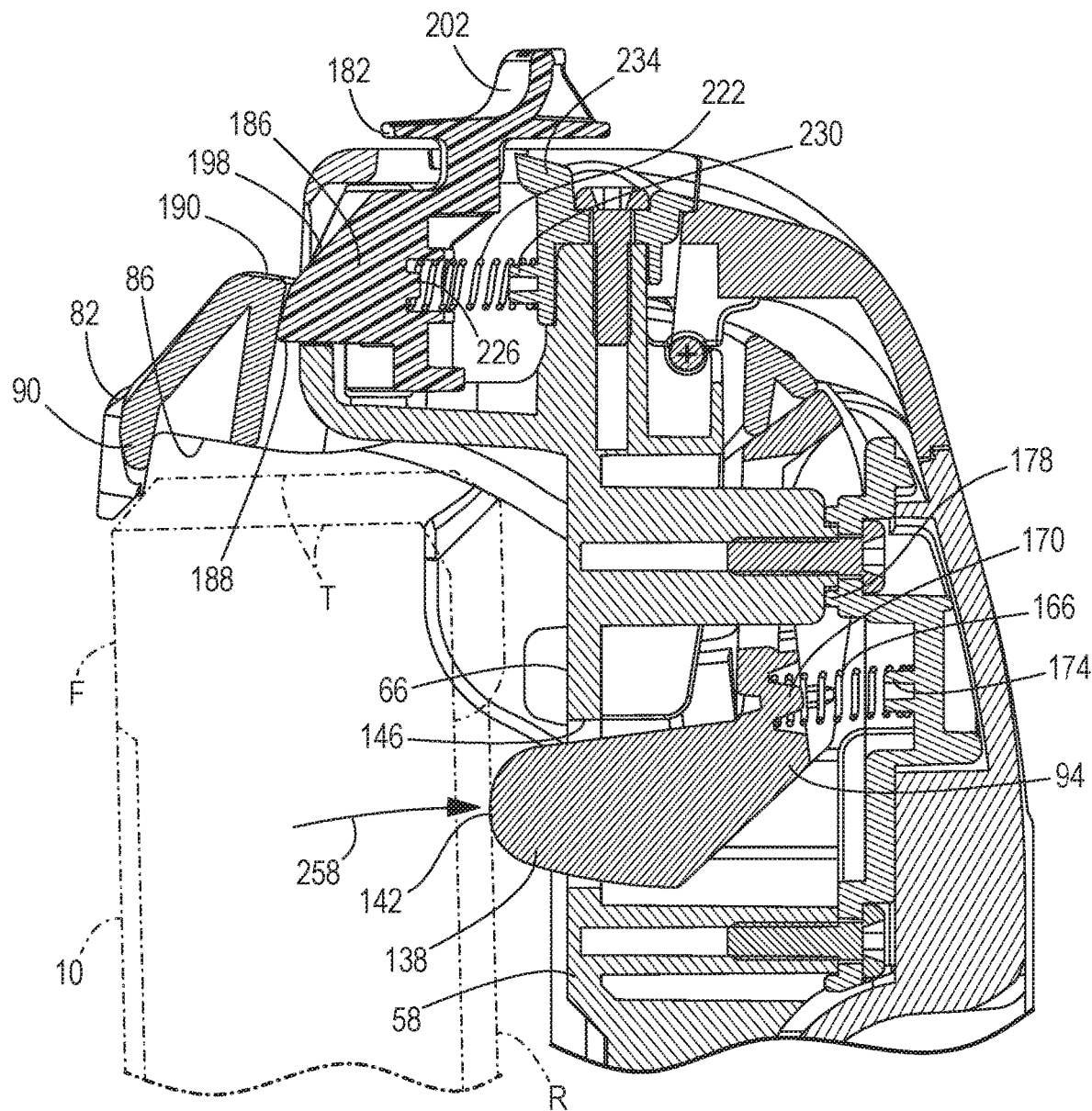
FIG. 9 is an enlarged partial section view of the docking station of FIG. 2 shown with the latching mechanism in an intermediate position as the portable computer is being installed.
Figure 10:
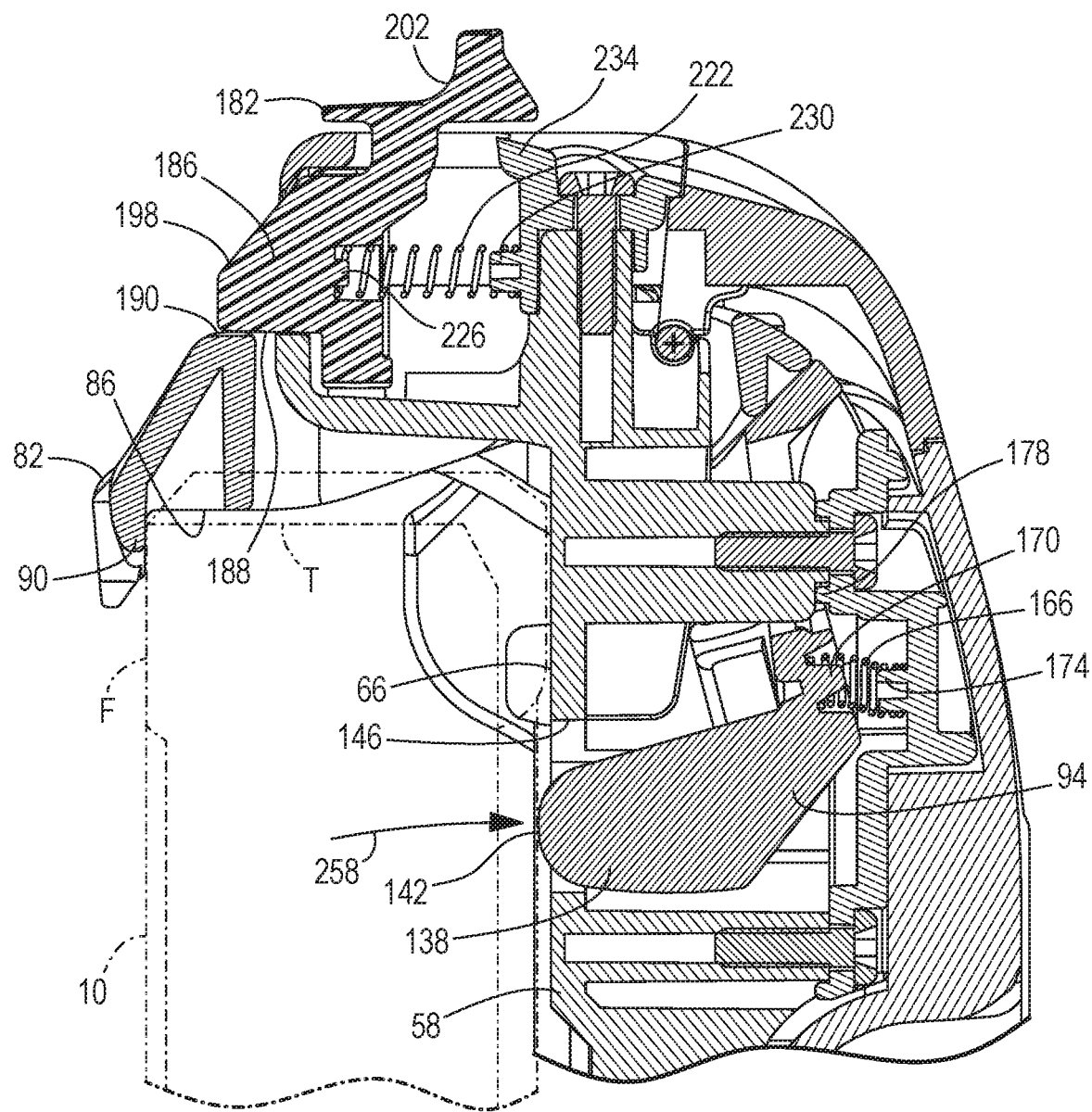
FIG. 10 is an enlarged partial section view of the docking station of FIG. 2 shown with the latching mechanism in the second, latched position securing the portable computer after installation is completed.

In some embodiments, the latch portion 82 also contacts another surface (e.g., the top edge or surface T) of the computer 10 to prevent movement of the computer 10 in a direction away from the base wall 26 of the cradle portion 22. As best shown in FIGS. 8-10, the latch portion 82 includes a first surface 86 configured to engage (or nearly engage) the top edge T of the computer 10 and one or more flanges 90 projecting from the first surface 86 configured to engage the front surface F of the computer 10. In the illustrated embodiment, the first surface 86 may not engage the top edge T of the computer 10, but instead may be spaced apart to include a slight clearance.

The latching mechanism 78 further includes an activation portion 94 coupled with the latch portion 82. The activation portion 94 is automatically movable, via contact with the computer 10 (e.g., via contact with a rear surface or face R of the computer 10) during insertion of the computer 10 into the docking station 14, from an activation portion first position extending from the body 18 (see FIGS. 5, 6, and 8), to an activation portion second position (see FIGS. 7 and 10). In the illustrated embodiment, the activation portion 94 at least partially extends from the body 18, and more specifically from the inner surface defined by the front face 66 of the rear wall portion 58, when in the activation portion first position. The activation portion 94 at least partially retracts into the rear wall portion 58 of the body 18 when moved to the activation portion second position upon contact with the rear surface R of the computer 10 during installation. Therefore, the activation portion 94 is extended from or retracted into an inner surface of the body 18 that engages and/or is adjacent to a rear surface of the computer 10 when the computer 10 is installed in the docking station 14.

Figure 13:
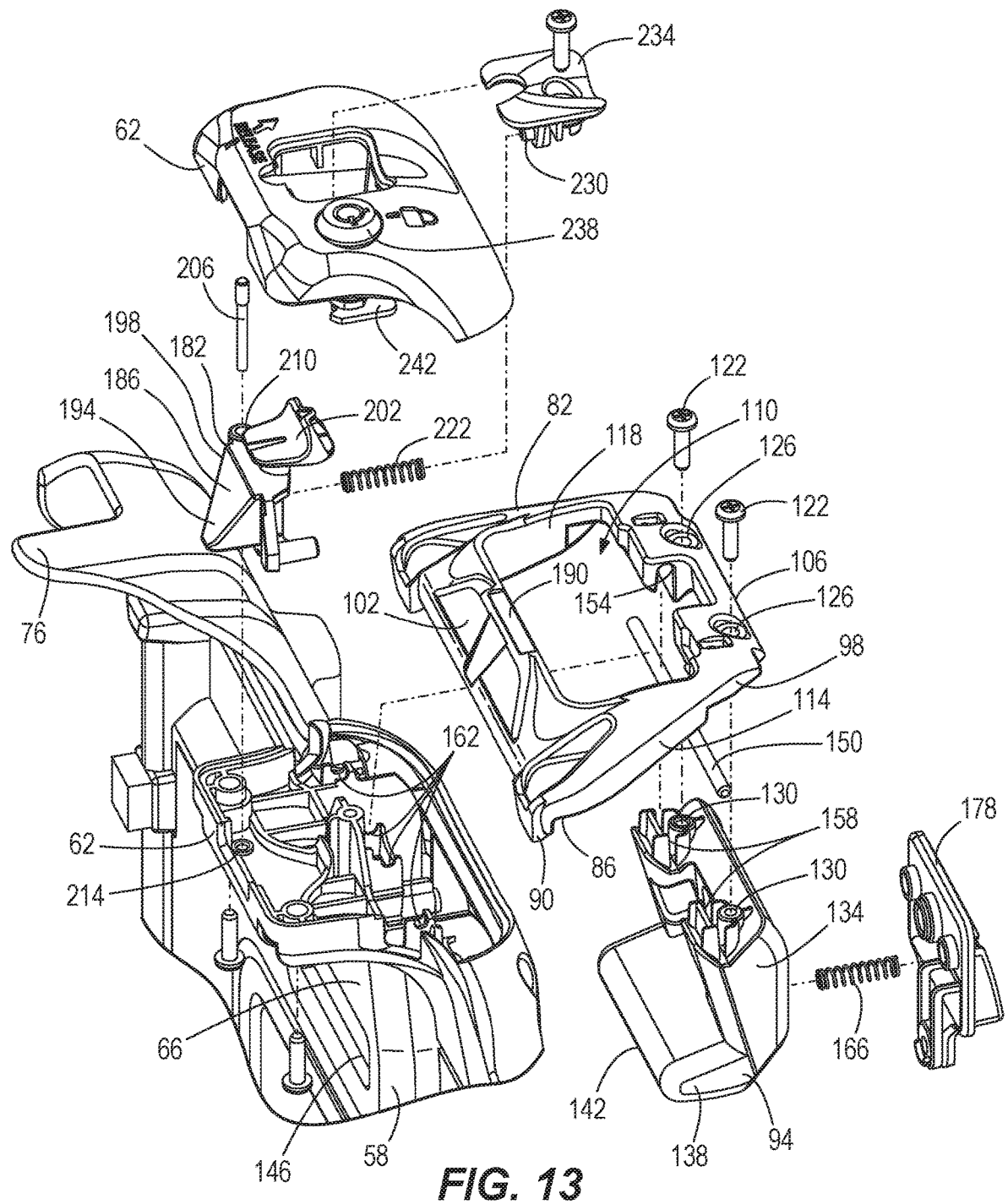
FIG. 13 is an exploded view showing an upper constraining portion of the docking station with the latching mechanism, the securing member, and the lock mechanism.
Figure 14:
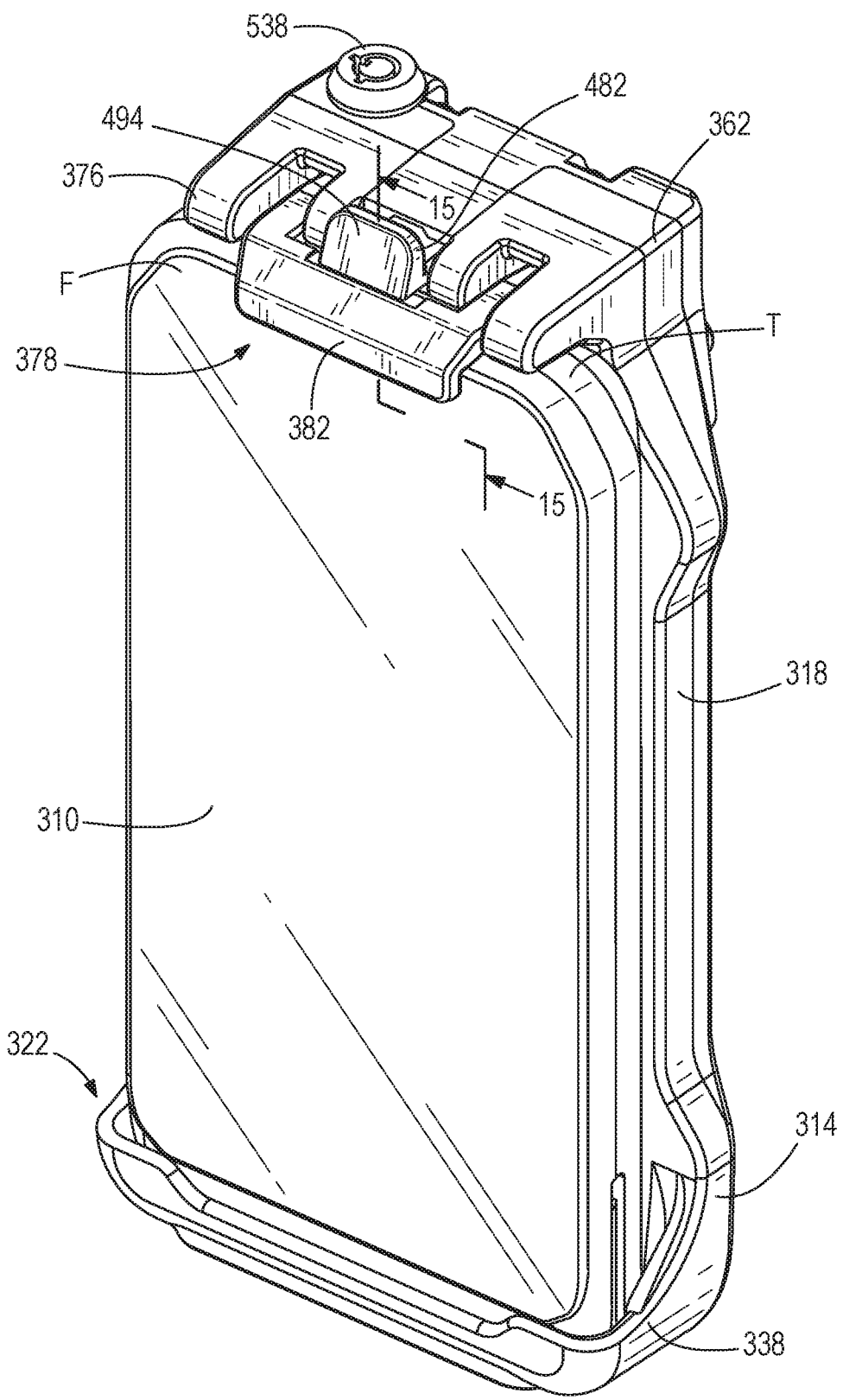
FIG. 14 is a front perspective view of another embodiment showing a portable electronic device docked in a docking station.

The latch portion 82 and the activation portion 94 of the latching mechanism 78 are coupled together to be movable together as a single unit in response to movement of the activation portion 94 from the activation portion first position to the activation portion second position. As best seen in FIG. 13, the latch portion 82 has a body 98 with a first end 102 including the first surface 86 and the flanges 90, and a second end 106 spaced from the first end 102. The body 98 includes an aperture 110 between the first and second ends 102, 106, which, when assembled, receives part of the upper constraining portion 62 of the body 18 and other components described below. In the illustrated embodiment, the body 98 of the latch portion 82 further includes first and second arms 114, 118 that extend between the first and second ends 102, 106, and that partially define the aperture 110. Therefore, the illustrated aperture 110 is completely enclosed by the first and second ends 102, 106 and the first and second arms 114, 118. The illustrated latch portion 82 is made of plastic, but could also be made of metal or other suitable materials.

Still referring to FIG. 13, the activation portion 94 is coupled to the second end 106 of the latch portion 82 via one or more fasteners 122 that pass through holes 126 in the second end 106 and are received in bosses 130 in the activation portion 94. Via the fasteners 122, the activation portion 94 and the latch portion 82 are rigidly secured together or unitized to move as one piece, as will be described further below. In other embodiments, different fastening mechanisms can be used. In yet other embodiments, the latch portion 82 and the activation portion 94 can be integrally formed as one part. The illustrated activation portion 94 is generally L-shaped and includes a first portion 134 that includes the bosses 130 and engages the latch portion 82, and a second portion 138 extending from the first portion 134 at an angle of about 90 degrees to 110 degrees. Other angles can also be used depending upon the structure and geometry of the docking station 14. The second portion 138 of the activation portion 94 has a computer contact surface 142 that, in the illustrated embodiment, defines a distal end of the second portion 138 that engages the rear surface R of the computer 10 as the computer 10 is installed into the docking station 14. The illustrated computer contact surface 142 is rounded or radiused to define a smooth surface to engage the computer 10. The contact surface 142 therefore defines a line contact with the rear surface R of the computer 10 when engaged. It is the second portion 138 of the activation portion 94 that extends from and at least partially retracts into the rear wall portion 58 of the body 18. The front surface 66 of the rear wall portion 58 includes an aperture 146 through which at least part of second portion 138 extends and retracts.

Referring to FIG. 13, one or both of the latch portion 82 and the activation portion 94 at least partially support a pivot pin 150 about which the coupled latch portion 82 and activation portion 94 pivot. The second end 106 of the latch portion 82 includes upper seats 154, and the first portion 134 of the activation portion 94 includes lower seats 158 that together receive and sandwich the pivot pin 150 when the fasteners 122 secure the latch portion 82 and the activation portion 94 together. A central portion of the pivot pin 150 is seated in one or more seats 162 formed with the upper constraining portion 62 of the body 18. When assembled, the latching mechanism 78 can pivot relative to the body 18 about a pivot point or pivot axis defined by the pivot pin 150 within the seat(s) 162 between the first, unlatched position (see FIG. 8), and the second, latched position (see FIG. 10).

With reference to FIGS. 8-10 and 13, a biasing member 166 (e.g., a spring) is provided and is seated at one end on a spring seat 170 on a rear surface of the activation portion 94 (e.g., on a rear surface of the first portion 134). The other end of the spring 166 is seated on a spring seat 174 formed on a portion of the body 18. In the illustrated embodiment, a separate insert 178 is coupled to the body 18 to form part of the body 18 and support the spring 166. The spring 166 biases the latching mechanism 78 toward the unlatched position as shown in FIG. 8. When the computer 10 is installed into the docking station 14, such that the second portion 138 of the activation portion 94 is at least partially retracted into the rear wall portion 58, the bias of the spring 166 is overcome and the spring is compressed (see FIGS. 9 and 10). This allows the pivoting of the latching mechanism 78 to the latched position against the bias of the spring 166.

The docking station 14 further includes a securing member 182 coupled with the body 18, and more specifically with the upper constraining portion 62 of the body 18. The securing member 182 is movable from a first or unsecured securing member position when the latching mechanism 78 is in the unlatched position (see FIGS. 5, 6, and 8), to a second or secured securing member position when the latching mechanism 78 is in the latched position (see FIGS. 1, 7, and 10). The secured position of the securing member 182 secures the latching mechanism 78 in the latched position.

With reference to FIGS. 8-10 and 13, the securing member 182 includes a tooth or pawl portion 186 configured to engage an upper surface portion 190 of the first end 102 of the latch portion 82 to secure the latching mechanism 78 in the latched position. The tooth portion 186 includes a cam surface 194 slidably engageable by the first end 102 of the latch portion 82 as the latching mechanism 78 moves from the unlatched position to the latched position. The illustrated cam surface 194 includes two oblique cam surfaces intersecting to define a cam edge 198 (see FIG. 1). The cam edge 198 defines the location on the tooth portion 186 where a majority of the sliding contact occurs between the securing member 182 and the latch portion 82. The latching mechanism 78 engages and slides relative to the securing member tooth portion 186 as the latching mechanism 78 moves from the unlatched position (see FIGS. 6 and 8) to the latched position, wherein the securing member 182 secures the latching mechanism 78 in the latched position (see FIGS. 7 and 10). The sliding engagement of the latch portion 82 and the tooth portion 186 automatically moves the securing member 182 to a third securing member position as shown in FIG. 9, in which the securing member 182 is pivoted slightly beyond the first, unsecured position, and further away from the secured position. In other words, the tooth portion 186 moves slightly inwards in a direction against the bias of the spring 222 (to the right in FIG. 9).

The securing member 182 further includes an activation tab portion 202 configured to be operated/depressed by a user to move the securing member 182 from the secured position to the unsecured position, in order to allow the latching member to automatically move from the latched position to the unlatched position via the bias of the spring 166. In the illustrated embodiment, the securing member 182 is a one-piece plastic or metal member on which both the tooth portion 186 and the activation tab portion 202 are integrally formed, however, in other embodiments, the securing member 182 can be formed from multiple pieces.

Figure 6:
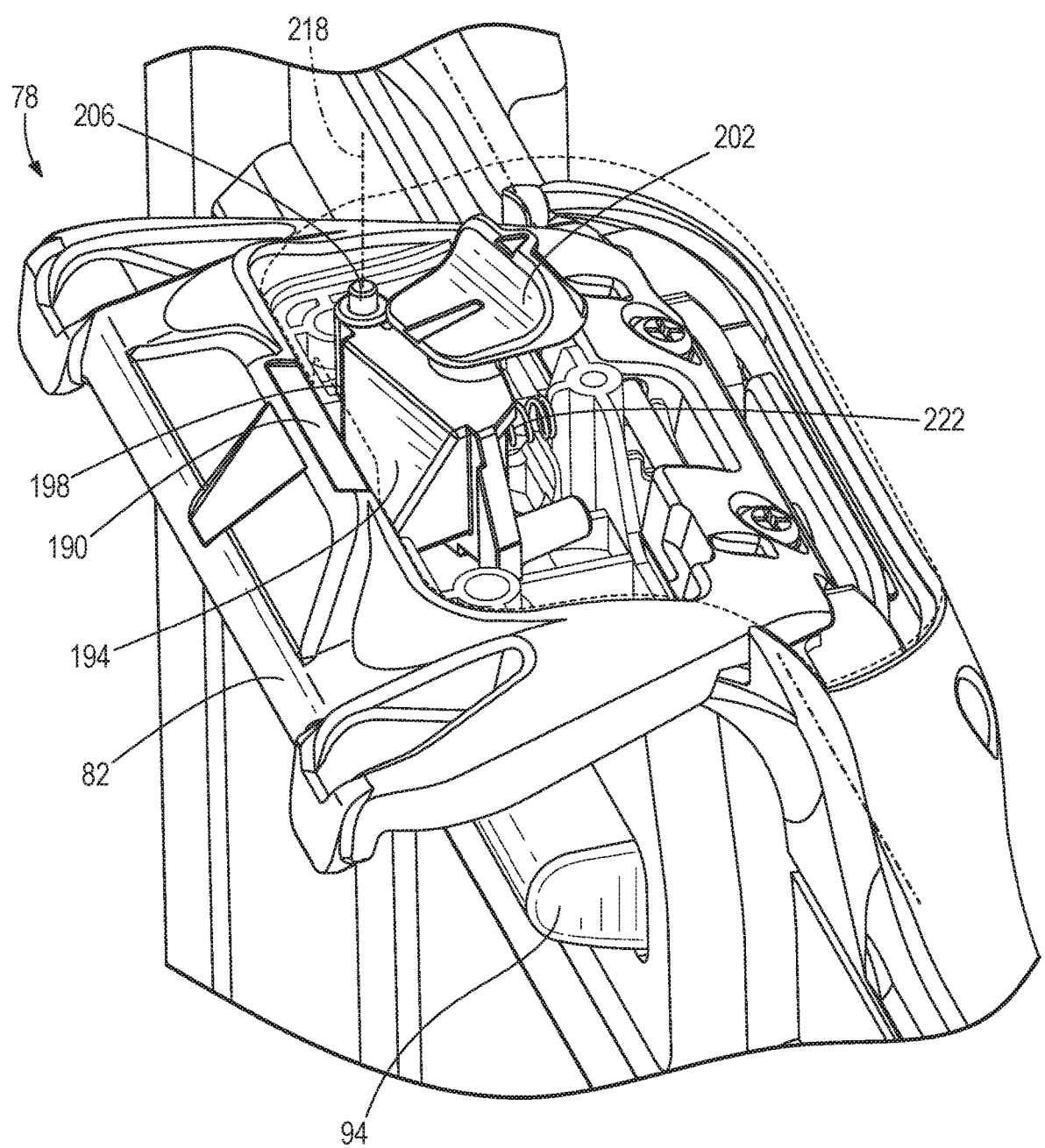
FIG. 6 is a partial top perspective view of the computer docking station of FIG. 2, shown with a portion of the housing removed, to show a latching mechanism in a first, unlatched position and a securing member in a first, unsecured position.
Figure 7:
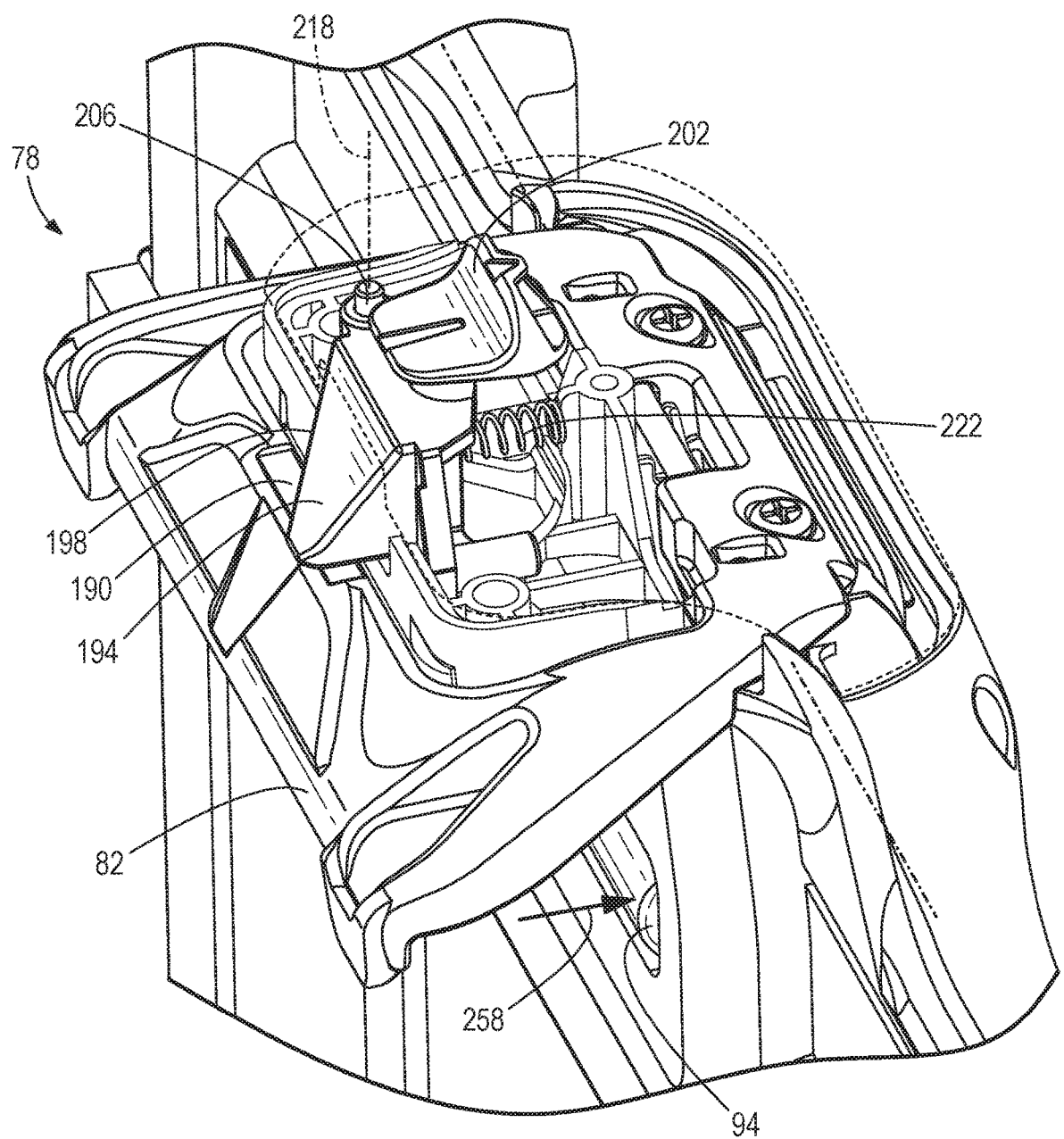
FIG. 7 is a partial top perspective view like FIG. 6, showing the latching mechanism in a second, latched position and a securing member in a second, secured position.

As best shown in FIG. 13, the illustrated securing member 182 is pivotably coupled to the upper constraining portion 62 of the body 18 using a pivot pin 206 supported in a bore 210 of the securing member 182 and in upper and lower seats 214 (only the lower seat is shown in FIG. 13) in the body 18. As best shown in FIGS. 6 and 7, the securing member 182 pivots about a pivot axis 218 defined by the pin 206 between the secured position (see FIG. 7) and the unsecured position (see FIG. 6). The pivot axis 218 is generally perpendicular to the pivot axis defined by the pivot pin 150 and is generally perpendicular to the base wall 26 of the cradle portion 22.

With reference to FIGS. 6-10 and 13, a biasing member 222 (e.g., a spring) is provided and is seated at one end on a spring seat 226 on a rear surface of the securing member 182 (e.g., on a rear surface of the tooth portion 186). The other end of the spring 222 is seated on a spring seat 230 formed on a portion of the body 18. In the illustrated embodiment, a separate insert 234 is coupled to the body 18 to form part of the body 18 and support the spring 222. The spring 222 biases the securing member 182 relative to the body 18 toward the secured position as shown in FIGS. 7 and 10. Therefore, as the latching member 78 moves from the unlatched position to the latched position during installation of the computer 10 into the docking station, the securing member 182 is urged toward the secured position and automatically reaches the secured position when a lower surface 188 of the tooth portion 186 clears the upper surface portion 190 of the latch portion 82. An audible "click" will be heard as the tooth portion 186 snaps into position over the upper surface portion 190 of the latch portion 82 to confirm the securing member 182 is constraining the latching mechanism 78 in the latched position.

To move the latching mechanism 78 out of the latched position, the securing member 182 is manually pivoted to the unsecured position (or beyond to the third position) against the bias of the spring 222 by the user pressing on the activation tab portion 202 to rotate the securing member 182 about the pivot axis 218. The spring 222 is compressed (see FIGS. 6, 8, and 9) and the tooth portion 186 moves rearwardly away from the front face F of the computer 10 and out of engagement with the upper surface portion 190 of the latch portion 82, thereby allowing the bias of the spring 166 to pivot the latching mechanism 78 about the pivot pin 150. This allows the latching mechanism 78 to automatically move to the unlatched position due to the bias of the spring 166. Therefore, the activation tab portion 202 operates as a release member that triggers automatic unlatching of the latching mechanism 78. Indicia 236 (See FIG. 2—e.g., the word "Release" and/or an arrow) can be provided on the docking station 14 in the vicinity of the activation tab portion 202 to indicate to a user the intended use and operation of the activation tab portion 202.

Figure 11:
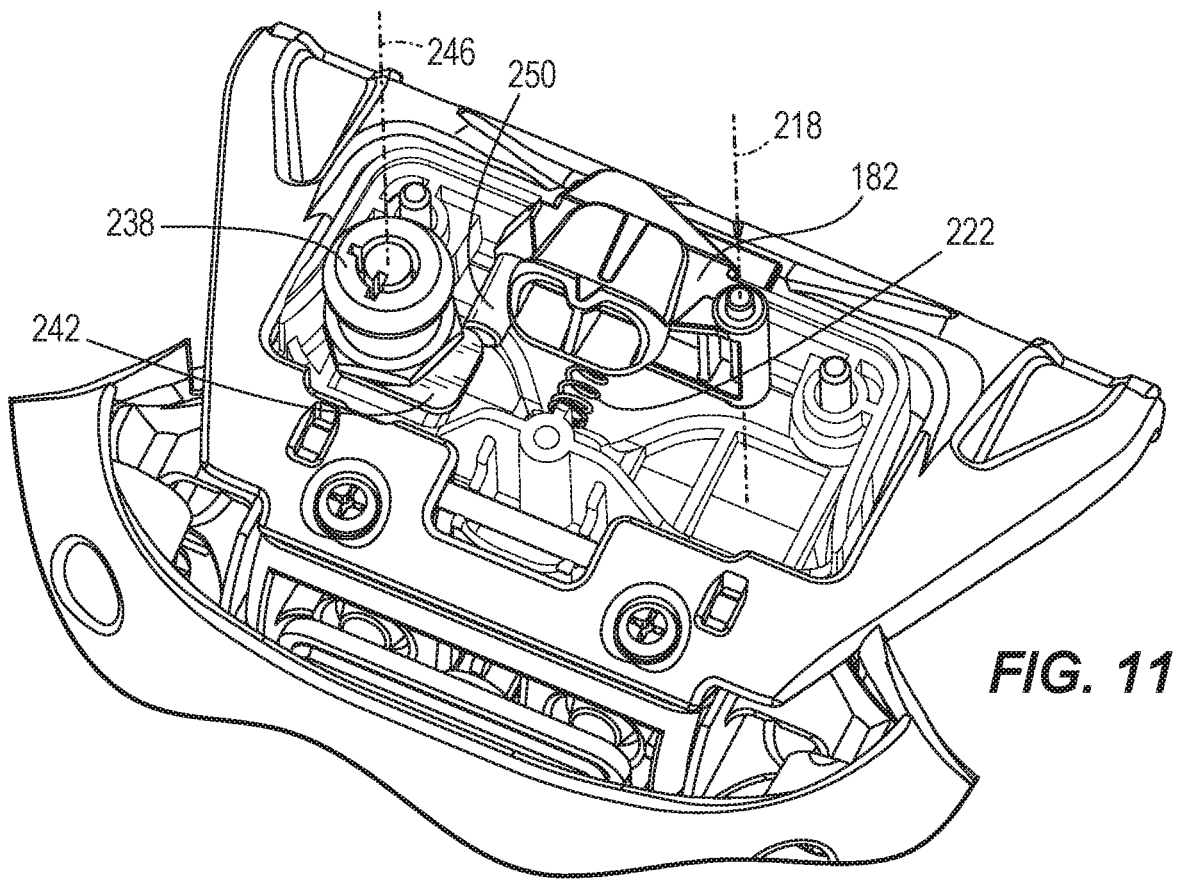
FIG. 11 is a partial top perspective view, shown with a portion of the housing removed, showing a lock mechanism in a first, locked position preventing movement of the securing member and the latching mechanism.
Figure 12:
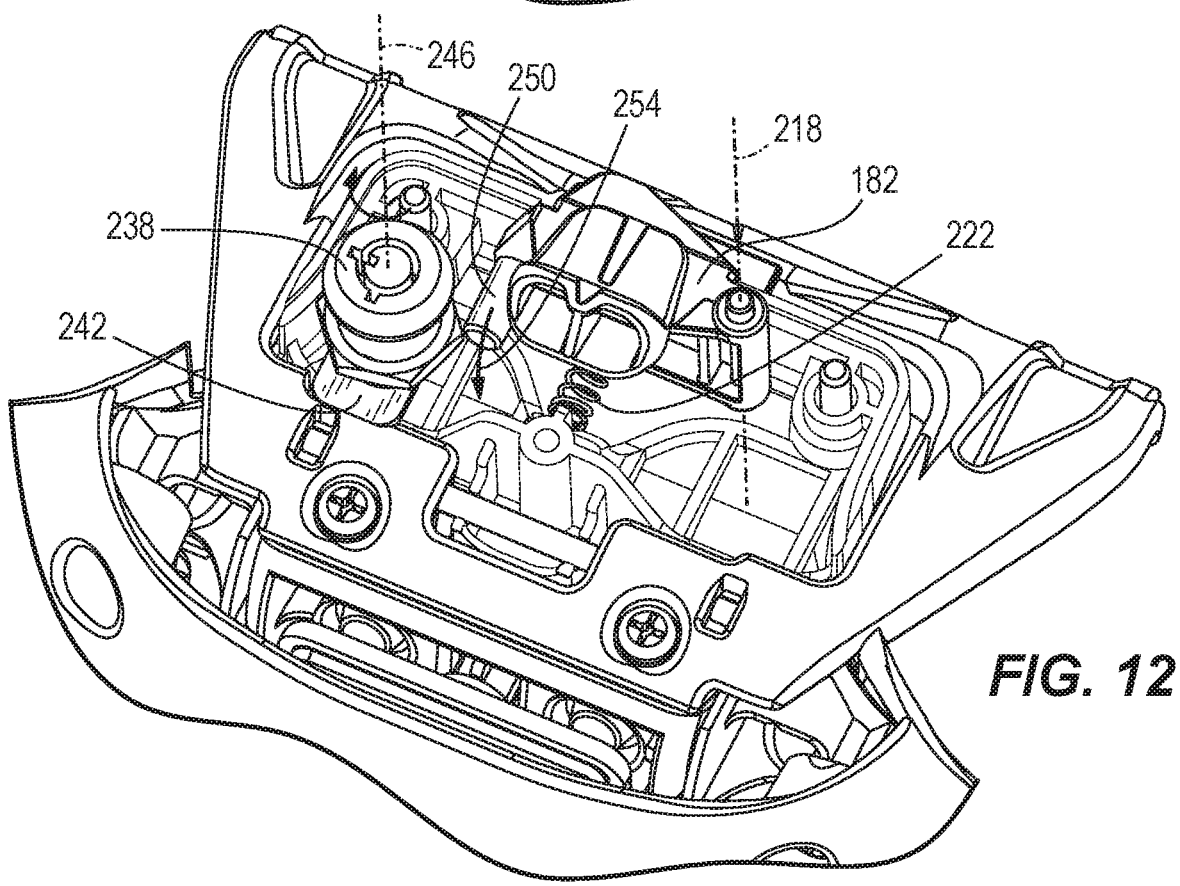
FIG. 12 is a partial top perspective view, shown with a portion of the housing removed, showing the lock mechanism in a second, unlocked position allowing movement of the securing member and the latching mechanism.

Referring now to FIGS. 11-13, the docking station 14 further includes an optional lock mechanism 238 movable from an unlocked position (see FIG. 12) that allows the securing member 182 to move to the unsecured position, to a locked position (see FIG. 11) that prevents the securing member 182 from moving to the unsecured position. When the lock mechanism 238 is in the locked position, the latching mechanism 78 is in the latched position, and the securing member 182 is in the secured position, the computer 10 cannot be removed from the docking station 14 because the securing member 182 cannot be moved to the unsecured position, and therefore, the latching mechanism cannot be moved to the unlatched position. When the lock mechanism 238 is in the unlocked position, the securing member 182 can be moved to the unsecured position, and therefore, the latching mechanism 78 can be moved to the unlatched position.

The lock mechanism 238 is at least partially received and supported in the upper constraining portion 62 of the body 18, and in the illustrated embodiment is operated with a key to rotate a pawl 242 about an axis 246. When the lock mechanism 238 is engaged (i.e., locked) to lock the securing member 182 in the secured position, the pawl 242 prevents the securing member 182 from moving to the first or unsecured position. This position is shown in FIG. 11, and it can be seen how the pawl 242 engages a projection 250 on the securing member 182 to prevent pivoting of the securing member about the axis 218. When the lock mechanism 238 is not engaged (i.e., unlocked), the securing member 182 is free to pivot in the direction of arrow 254 about axis 218 against the bias of the spring 222. Other lock mechanisms can be substituted for the illustrated key-activated lock mechanism 238.

The process of installing a computer 10 into the docking station 14 will now be described. First, the latching mechanism 78 should be in the unlatched position to receive the computer 10 into the docking station 14. The bias of the spring 166 holds the latching mechanism in the unlatched position. Next, the user inserts the lower edge of the computer 10 into the cradle portion 22 with the top edge T of the computer 10 pivoted away from the rear wall portion 58. The user then begins to pivot the top edge T of the computer 10 toward the rear wall portion 58 and the upper constraining portion 62, where the fingers 76 of the upper constraining portion 62 will first engage the top edge T of the computer 10. The fingers 76 can be resilient to permit some deflection during installation. The fingers 76 help to create a downward force on the computer 10 that helps seat the lower edge of the computer 10 in the cradle portion 22. They also help to guide the pivoting movement of the upper edge T of the computer 10 toward the rear wall portion 58. The central support member 70 also guides and locates the computer 10 during this portion of the installation.

Referring now to FIGS. 8-10, as pivoting of the computer 10 continues, the rear surface R of the computer 10 contacts the contact surface 142 of the activation portion 94 (see FIG. 9) to apply force to the activation portion 94 in the direction of the arrow 258. As pivoting continues, the second portion 138 of the activation portion 94 retracts into the rear wall portion 58 through the aperture 146. This pivots the latching mechanism 78 about the pivot pin 150 so that as the activation portion 94 is retracting, the latch portion 82 is moving (e.g., pivoting) downwardly toward the top edge T of the computer 10.

When the computer 10 is pivoted to the installed position shown in FIG. 10, the activation portion 94 achieves its fully retracted position and the latch portion 82 reaches its fully latched position in which the flanges 90 pass over the edge defined between the top edge T and the front face F of the computer 10 to engage the front face F of the computer. At this same instant when the latch portion 82 reaches its fully latched position, the lower surface 188 of the tooth portion 186 of the securing member 182 clears the upper surface portion 190 of the latch portion 82 so that the securing member 182 automatically moves to the secured position under the bias of the spring 222. At this point, an audible "click" can be heard and the user will recognize that the computer 10 has been successfully installed and secured into the docking station 14. If desired, the user can then lock the lock mechanism 238 using a key to rotate the lock cylinder, and therefore the pawl 242, about the axis 246 so that the pawl 242 abuts the projection 250 of the securing member 182. This prevents the securing member 182 from being moved to the unsecured position.

To summarize the interaction between the latching mechanism 78 and the securing member 182 during installation of the computer 10, the contact by the computer 10 with the activation portion 94 causes the latching mechanism 78 to pivot about the pivot pin 150 (counter-clockwise in FIGS. 8-10). This pivoting causes the latch portion 82 pivot downwardly, and in so doing, to slide downwardly along the cam edge 198 of the tooth portion 186. As this sliding occurs, the tooth portion 186 is moved or depressed inwardly against the bias of the spring 222 until the latch portion 82 pivots far enough downwardly that the tooth portion 186 clears the upper surface portion 190 of the latch portion 82. At this point, the bias of the spring 222 automatically extends the tooth portion 186 outwardly and over the upper surface portion 190, as shown in FIG. 10, to secure the latching mechanism in the latched position.

To remove the computer 10 from the docking station 14, the user can first unlock the lock mechanism 238 if it had been locked. Next, the user manually moves the activation tab member 202 of the securing member 182 in a direction away from the front surface F of the computer 10 so that the securing member 182 moves or pivots about the axis 218 to at least the second, unsecured position. As the tooth 186 clears the upper surface portion 190 of the latch portion 82, the bias of the spring 166 helps to pivot the latching mechanism 78 toward the unlatched position, in which the latch portion 82 moves upwardly so that the flanges 90 disengage the front surface F of the computer 10. At the same time, the activation portion 94 extends from its fully retracted position and applies force to the rear surface R of the computer 10 to initiate pivoting of the computer 10 away from the rear wall portion 58 of the body 18.

The user can then pivot the computer 10 further away from the upper constraining portion 62 until the top edge T is clear to allow the computer to be withdrawn from the docking station 14. The undocking and removal of the computer 10 can be done with a single hand, whereby the user grabs the top edge T as if picking the computer 10 up off a table. The user's thumb will be generally aligned with the activation tab member 202 so that the activation tab member 202 can be intuitively pressed by the user's thumb, and at the same time, the user can pivot the top of the computer 10 away from the upper constraining portion 62 to remove the computer 10 from the docking station 14.

FIGS. 14-18 illustrate another embodiment of a docking station 314 according to the present invention. In this embodiment, the portable electronic device 310 takes the form of a phone. The docking station 314 is configured to support the specific configuration of the phone 310, but can alternatively be configured to support electronic devices of all types (e.g., computers, phones, keyboards, printers, etc.). The docking station 314 is similar in many regards to the docking station 14, with like parts having like reference numbers of the 300, 400, and 500 series (adding 300 to the original reference number). Only the main differences between the docking station 314 and the docking station 14 will be described in detail below.

Figure 15:
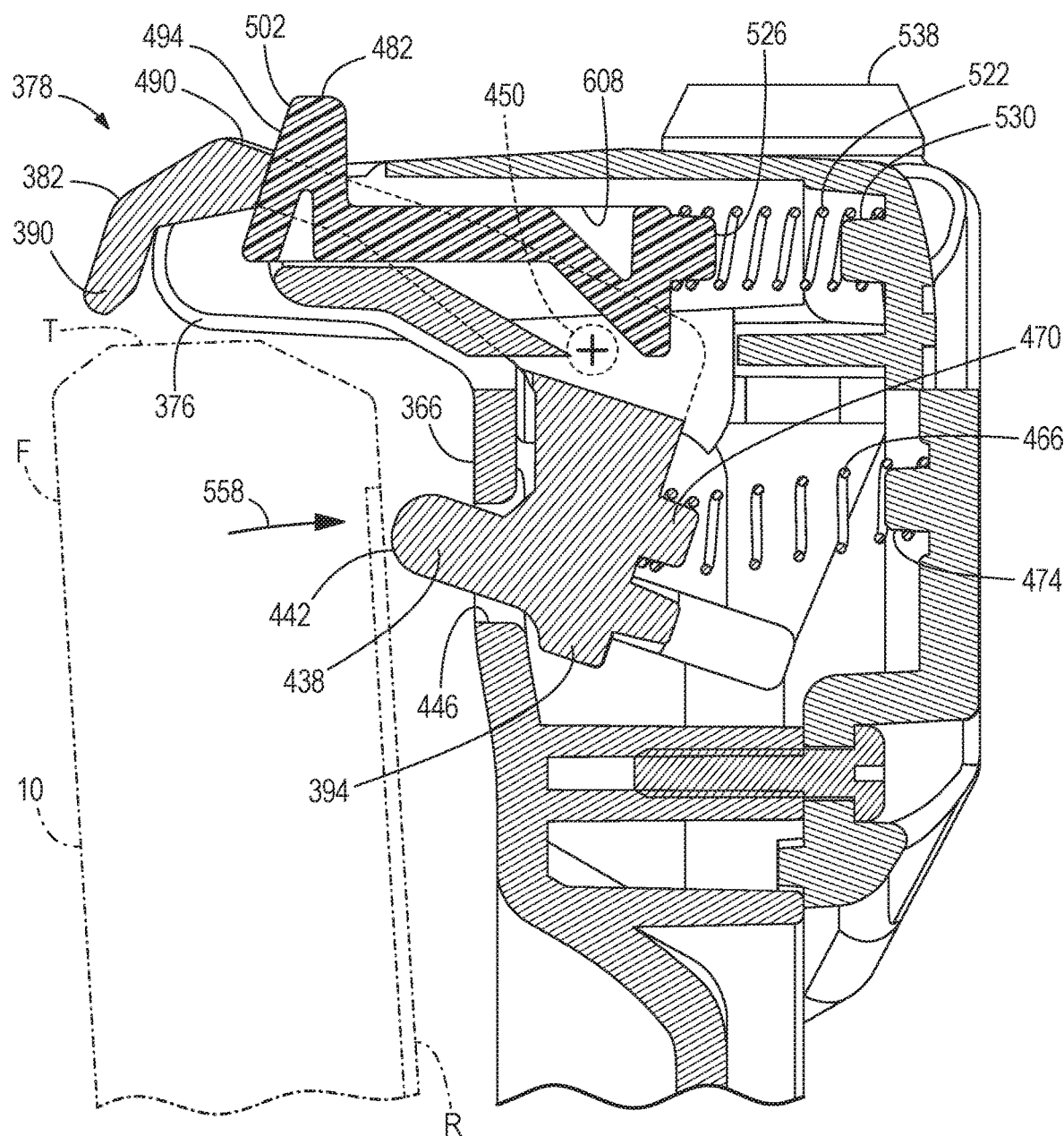
FIG. 15 is an enlarged partial section view of the docking station of FIG. 14 shown with the latching mechanism in the first, unlatched position to receive a portable electronic device.
Figure 18:
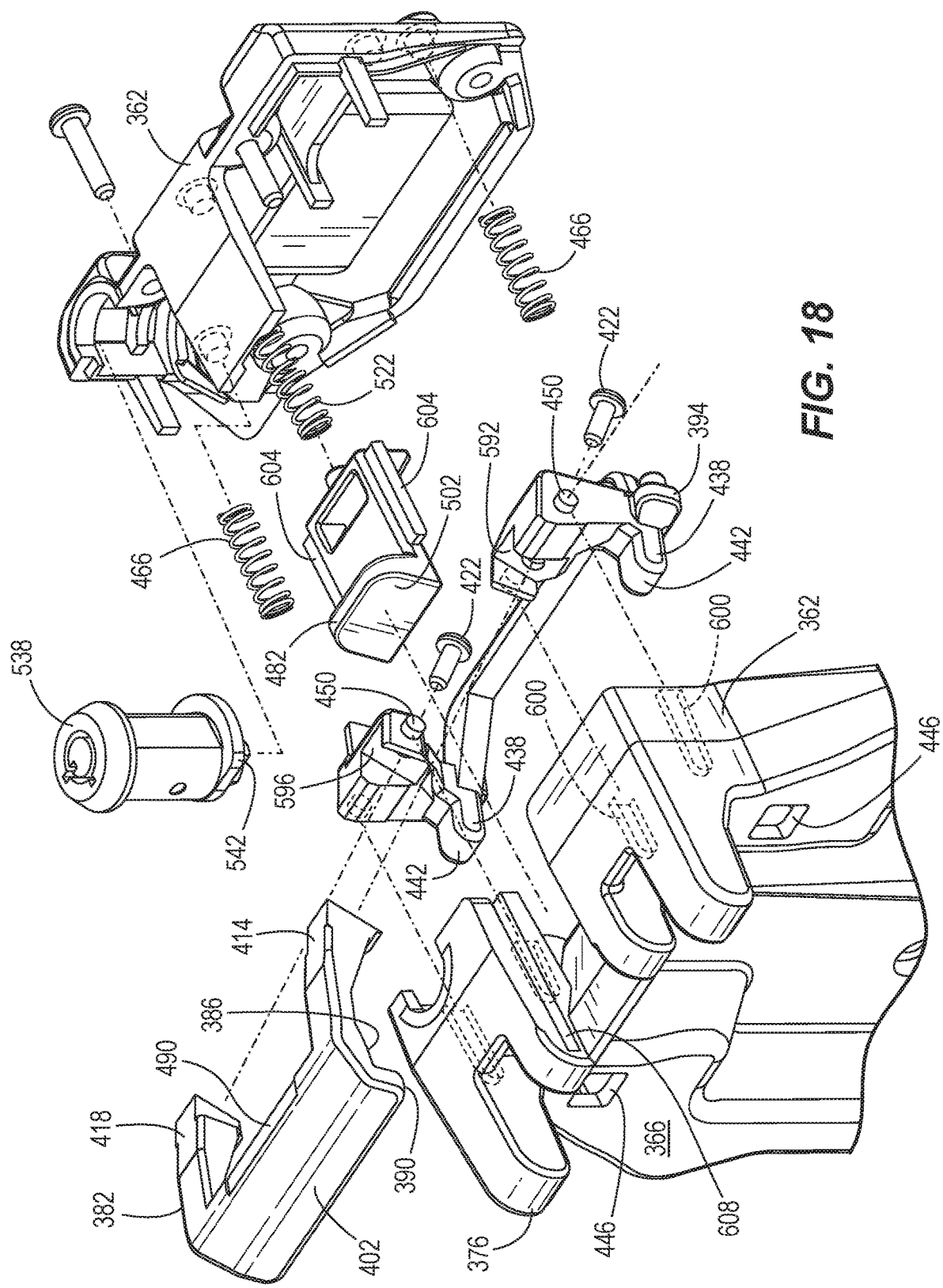
FIG. 18 is an exploded view showing an upper constraining portion of the docking station of FIG. 14 with the latching mechanism, the securing member, and the lock mechanism.

The operation of the latching mechanism 378 is substantially the same, with one structural difference being that the activation portion 394 has two, spaced-apart second portions 438, each projecting through a respective aperture 446 in the rear surface 366 of the docking station 314 (see FIG. 18). Therefore, the rear surface R of the electronic device 310 contacts both spaced-apart second portions 438 at the respective contact surfaces 442. There are also two biasing springs 466, one adjacent each second portion 438, that bias the latching mechanism 378 toward the unlatched position as shown in FIG. 15. As shown in FIG. 18, instead of a single pivot pin 150 about which the latching mechanism 378 pivots, a plurality of pivot bosses 450 are provided on the activation portion 394 and are received in respective slots 600 formed in the upper constraining portion 362. The latch portion 382 is coupled to the activation portion 394 by inserting distal ends of the first and second arms 414, 418 into respective recesses 592, 596 in the activation portion 394. The fasteners 422 secure the arms 414, 418 to the activation portion 394 such that the latch portion 382 and the activation portion 394 pivot together as a unit.

One difference in the operation of the securing member 482 is that instead of moving in a pivoting manner like the securing member 182, the securing member 482 is constrained to translational or sliding movement only. The securing member 482 includes tongues 604 configured to be received in grooves 608 in the upper constraining portion 362. Of course, the tongue and groove arrangement could also be reversed, with the tongues 604 formed on the upper constraining portion 362 to be received in grooves 608 formed in the securing member 482. Additionally, the activation tab portion 502 is integrated with the tooth portion to define the cam surface 494 over which the latch portion 382 slides.

Figure 16:
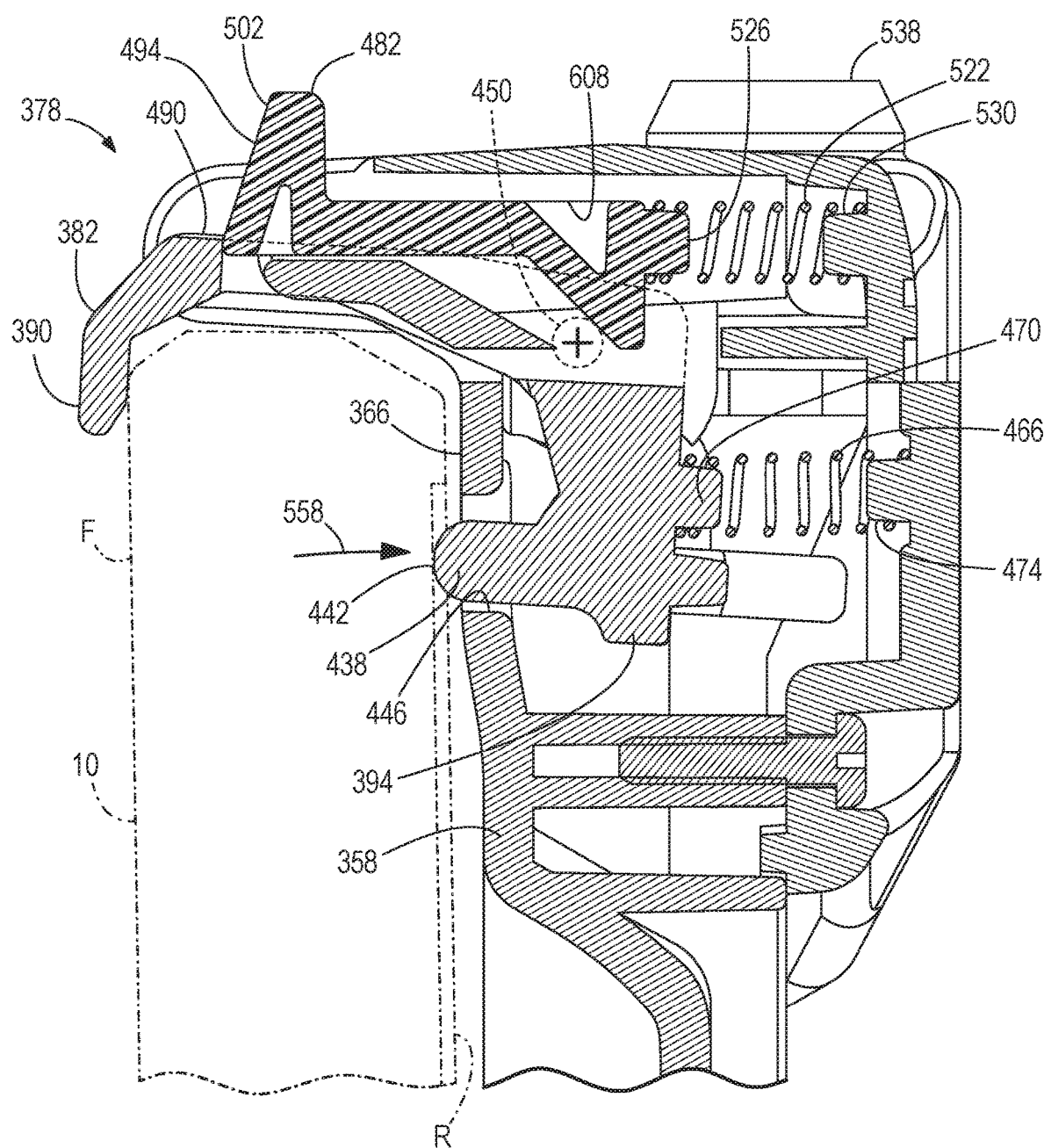
FIG. 16 is an enlarged partial section view of the docking station of FIG. 14 shown with the latching mechanism in an intermediate position as the portable electronic device is being installed.
Figure 17:
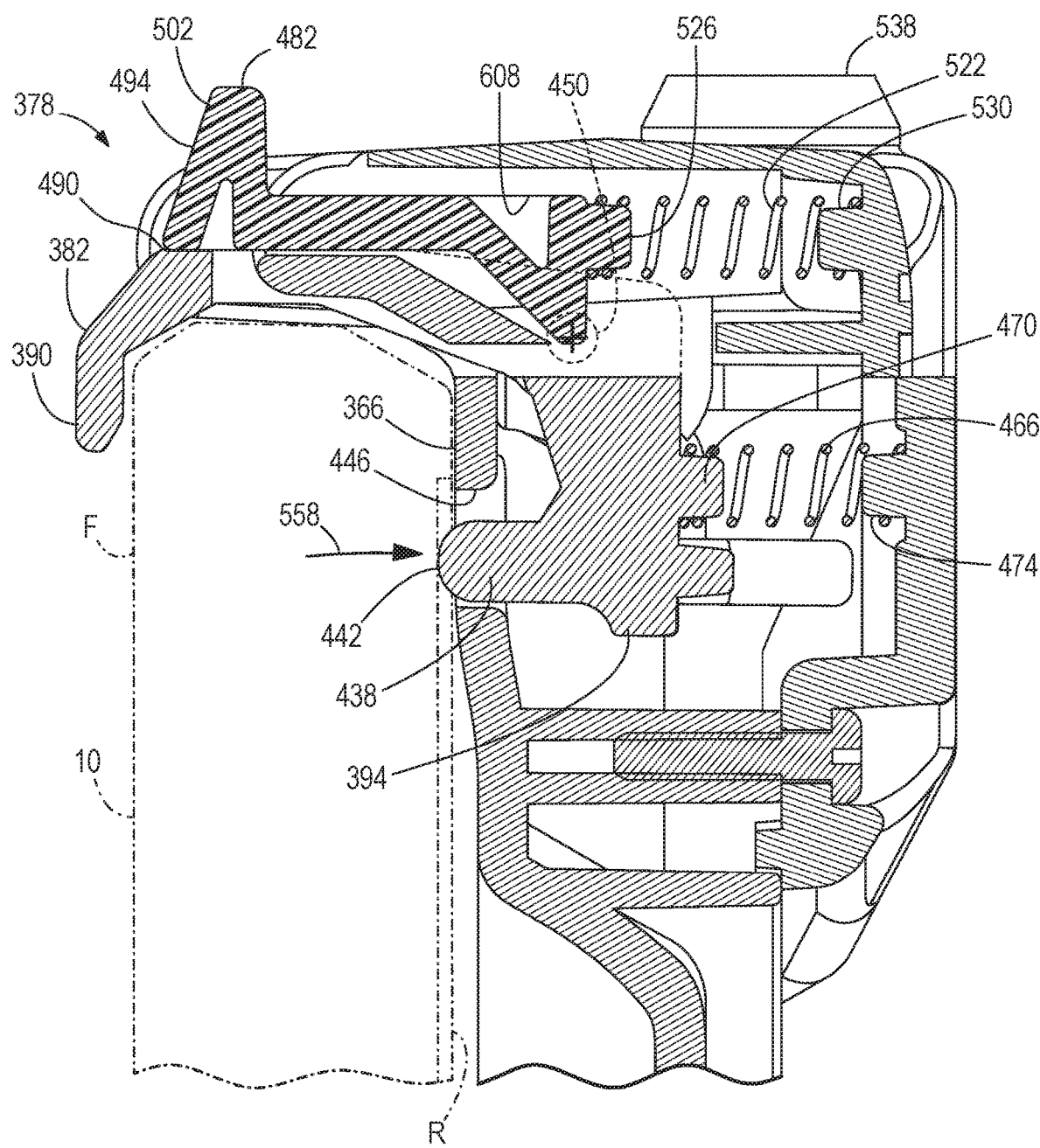
FIG. 17 is an enlarged partial section view of the docking station of FIG. 14 shown with the latching mechanism in the second, latched position securing the portable electronic device after installation is completed.

To summarize the interaction between the latching mechanism 378 and the securing member 482 during installation of the phone 310, contact by the phone 310 with the activation portion 394 causes the latching mechanism 378 to pivot about the pivot bosses 450 (counter-clockwise in FIGS. 15-17). This pivoting causes the latch portion 382 pivot downwardly, and in so doing, to slide downwardly along the cam surface 494 of the integrated activation tab portion/tooth portion 502. As this sliding occurs, the activation portion 502 is moved or depressed inwardly, as guided by the tongues 604 in the respective grooves 608, against the bias of the spring 522 until the latch portion 382 pivots far enough downwardly that the activation portion 502 clears the upper surface portion 490 of the latch portion 382. At this point, the bias of the spring 522 automatically moves the securing member 482 outwardly so that the activation portion 502 extends over the upper surface portion 490 of the latch portion 382, as shown in FIG. 17, to secure the latching mechanism 378 in the latched position. When the lock mechanism 538 is engaged (i.e., locked) to lock the securing member 482 in the secured position, the pawl 542 abuts a portion of the securing member 482 to prevent the securing member 482 from moving (e.g., sliding rearwardly) to the first or unsecured position.

Various features and advantages of the invention are set forth in the following claims.

What is claimed is:

1. A docking station for supporting an electronic device, the docking station comprising:
   a body having a cradle portion configured to support a portion of the electronic device; and
   a latching mechanism coupled with the body and movable between a latching mechanism first position configured to permit insertion of the electronic device into the docking station and a latching mechanism second position configured to secure the electronic device in the docking station, the latching mechanism including
      an activation portion configured to contact a first surface of the electronic device, the activation portion automatically movable via contact with the electronic device during insertion of the electronic device into the docking station from an activation portion first position extending from the body, to an activation portion second position, and
      a latch portion configured to engage a second surface of the electronic device when the latching mechanism is in the latching mechanism second position, the latch portion being pivotable in response to movement of the activation portion from the activation portion first position to the activation portion second position; and
      a securing member coupled with the body and movable from a first securing member position when the latching mechanism is in the first latching mechanism position, to a second securing member position when the latching mechanism is in the second latching mechanism position, the second securing member position securing the latching mechanism in the second latching mechanism position.

2. The docking station of claim 1, wherein the activation portion pivots relative to the body between the first and second latching mechanism positions.

3. The docking station of claim 1, wherein the securing member is biased relative to the body such that the securing member automatically moves from the first securing member position to the second securing member position when the latching mechanism reaches the second latching mechanism position.

4. The docking station of claim 3, wherein the latching mechanism in the first latching mechanism position holds the securing member in the first securing member position against the bias.

5. The docking station of claim 3, wherein the latching mechanism engages and slides relative to the securing member as the latching mechanism moves from the first latching mechanism position to the second latching mechanism position.

6. The docking station of claim 5, wherein as the latching mechanism slides relative to the securing member, the securing member is moved to a third securing member position.

7. The docking station of claim 6, wherein the securing member includes a cam surface engageable by the latching mechanism as the latching mechanism moves from the first latching mechanism position to the second latching mechanism position to automatically move the securing member to the third securing member position.

8. The computer docking station of claim 7, wherein the cam surface includes two oblique cam surfaces intersecting to define a cam edge.

9. The docking station of claim 1, further comprising a lock mechanism movable from an unlocked position that allows the securing member to move to the first securing member position, to a locked position that prevents the securing member from moving to the first securing member position.

10. The docking station of claim 1, wherein the latching mechanism automatically moves to the latching mechanism first position when the securing member is moved to the first securing member position.

11. The docking station of claim 10, wherein the latching mechanism is biased toward the latching mechanism first position by a biasing member.

12. The docking station of claim 1, further comprising an activation tab portion manually operable to move the securing member to the first securing member position.

13. The docking station of claim 1, further comprising a connector in the body operable to electrically couple with the electronic device.

14. The docking station of claim 1, wherein the activation portion of the latching mechanism at least partially extends from the body when in the activation portion first position, and at least partially retracts into the body when moved to the activation portion second position.

15. The docking station of claim 14, wherein the activation portion of the latching mechanism is extended from or retracted into an inner surface of the body adjacent a rear surface of the electronic device when the electronic device is installed in the docking station.

16. The docking station of claim 1, wherein the latching mechanism engages a surface of the electronic device that is visible to a user when the electronic device is installed in the docking station and the latching mechanism is in the second latching mechanism position.

17. The docking station of claim 1, wherein the latching mechanism is pivotably movable about a first pivot axis and the securing member is pivotably movable about a second pivot axis that is perpendicular to the first pivot axis.

18. The docking station of claim 1, wherein the latching mechanism is pivotably movable about a pivot axis and the securing member is constrained to translational movement.

19. A docking station for supporting an electronic device, the docking station comprising:
- a body having a cradle portion configured to support a portion of the electronic device;
- a latching mechanism pivotally coupled with the body and pivotable between a latching mechanism first position configured to permit insertion of the electronic device into the docking station, and a latching mechanism second position configured to secure the electronic device in the docking station, the latching mechanism being biased toward the latching mechanism first position by a biasing member, the latching mechanism including
  - an activation portion configured to contact a first surface of the electronic device, the activation portion automatically movable via contact with the electronic device during insertion of the electronic device into the docking station from an activation portion first position extending from the body, to an activation portion second position at least partially retracted into the body, and
  - a latch portion configured to engage a second surface of the electronic device when the latching mechanism is in the latching mechanism second position, the latch portion being movable in response to movement of the activation portion from the activation portion first position to the activation portion second position;
- a securing member coupled with the body and movable relative to the latch portion from a first securing member position when the latching mechanism is in the first latching mechanism position, to a second securing member position when the latching mechanism is in the second latching mechanism position, the second securing member position securing the latching mechanism in the second latching mechanism position, the securing member being biased toward the second securing member position; and
- a lock mechanism movable from an unlocked position that allows the securing member to move to the first securing member position, to a locked position that prevents the securing member from moving to the first securing member position.

20. The docking station of claim 19, wherein the latching mechanism is pivotably movable about a first pivot axis and the securing member is pivotably movable about a second pivot axis that is perpendicular to the first pivot axis.

21. The docking station of claim 19, wherein the latching mechanism is pivotably movable about a pivot axis and the securing member is constrained to translational movement.

22. A docking station for supporting an electronic device, the docking station comprising:
- a body having a cradle portion configured to support a portion of the electronic device;
- a latching mechanism pivotally coupled with the body and pivotable between a latching mechanism first position configured to permit insertion of the electronic device into the docking station, and a latching mechanism second position configured to secure the electronic device in the docking station, wherein the latching mechanism is biased from the latching mechanism second position toward the latching mechanism first position by a first biasing member, the latching mechanism including
  - an activation portion configured to contact a first surface of the electronic device, the activation portion automatically movable via contact with the electronic device during insertion of the electronic device into the docking station, wherein during insertion of the electronic device into the docking station the activation portion moves from an activation portion first position extending from a portion of a rear wall of the body to an activation portion second position at least partially retracted into the portion of the rear wall of the body, and
  - a latch portion configured to engage a second surface of the electronic device that is visible to a user when the electronic device is installed in the docking station and the latching mechanism is in the latching mechanism second position, the latch portion being movable in response to movement of the activation portion from the activation portion first position to the activation portion second position, wherein the latch portion remains a constant distance from the activation portion as the latch mechanism moves between the latching mechanism first position and the latching mechanism second position;
- a securing member coupled with the body and movable relative to the latch portion from a first securing member position when the latching mechanism is in the first latching mechanism position to a second securing member position when the latching mechanism is in the second latching mechanism position, the second securing member position securing the latching mechanism in the second latching mechanism position against the bias of the first biasing member, the securing member being biased by a second biasing member toward the second securing member position, wherein the latching mechanism in the first latching mechanism position holds the securing member in the first securing member position against the bias of the second biasing member; and
- a lock mechanism movable from an unlocked position that allows the securing member to move to the first securing member position, to a locked position that prevents the securing member from moving to the first securing member position.

23. The docking station of claim 22, wherein during insertion of the electronic device into the docking station when the latching mechanism moves from the latching mechanism first position to the latching member second position, the activation portion pivots in a first direction and the latch portion pivots in a second direction opposite the first direction.

24. The docking station of claim 22, wherein the latch portion cams the securing member toward a third securing member position as the latching mechanism moves from the first latching mechanism position to the second latching mechanism position.

25. The docking station of claim 24, wherein the securing member automatically moves from the third securing member position to the second securing member position when the latching mechanism reaches the second latching mechanism position.

* * * * *